United States Patent [19]
Kaitani et al.

[11] Patent Number: 6,066,934
[45] Date of Patent: May 23, 2000

[54] INDUCTION MOTOR CONTROLLER

[75] Inventors: Toshiyuki Kaitani; Tetuaki Nagano; Akira Imanaka; Yasuhiro Shiraishi, all of Nagoya, Japan

[73] Assignee: Mitsubishi Denki Kabushiki Kaisha, Tokyo, Japan

[21] Appl. No.: 09/171,569
[22] PCT Filed: Mar. 11, 1997
[86] PCT No.: PCT/JP97/00752
§ 371 Date: Oct. 21, 1998
§ 102(e) Date: Oct. 21, 1998
[87] PCT Pub. No.: WO98/40964
PCT Pub. Date: Sep. 17, 1998
[51] Int. Cl.[7] .................................................. H02P 7/63
[52] U.S. Cl. ........................ 318/490; 318/798; 318/801
[58] Field of Search ................................ 318/490, 727, 318/798–801, 804–809; 324/525, 691

[56] References Cited

U.S. PATENT DOCUMENTS

| | | | |
|---|---|---|---|
| 4,204,425 | 5/1980 | Mallick, Jr. | 73/116 |
| 4,567,419 | 1/1986 | Watanabe | 318/798 |
| 4,670,698 | 6/1987 | Fulton et al. | 318/802 |
| 4,780,658 | 10/1988 | Koyama | 318/808 |
| 4,789,834 | 12/1988 | Koopman | 324/417 |
| 4,801,877 | 1/1989 | Herrick et al. | 324/772 |

FOREIGN PATENT DOCUMENTS

| | | |
|---|---|---|
| 60-16184 | 1/1985 | Japan . |
| 62-114487 | 5/1987 | Japan . |
| 63-245290 | 10/1988 | Japan . |
| 049868 | 1/1992 | Japan . |
| 04285878 | 10/1992 | Japan . |
| 04364384 | 12/1992 | Japan . |
| 06098595 | 4/1994 | Japan . |
| 07107799 | 4/1995 | Japan . |
| 07298687 | 11/1995 | Japan . |
| 07325132 | 12/1995 | Japan . |
| 08149884 | 6/1996 | Japan . |
| 09117149 | 5/1997 | Japan . |

OTHER PUBLICATIONS

"A Method of Calculating the Characteristics of Squirrel Cage Type Induction Motor Driven by a Nonsinusoidal Voltage Source", Tadao Fujimaki et al, pp. 108–116, Electrical Engineering in Japan, vol. 104, No. 3, 1984.

*Primary Examiner*—Bentsu Ro
*Attorney, Agent, or Firm*—Sughrue, Mion, Zinn, Macpeak & Seas, PLLC

[57] ABSTRACT

The invention is an induction motor controller for measuring electrical constants of a polyphase induction motor (102) by supplying test power thereto and controlling driving of the polyphase induction motor with a polyphase inverter (105) by using parameters for controlling driving of a result of the measurement. This controller has a first computing means (106) for computing secondary winding resistance R2 as well as leakage inductance L corresponding to each of test conditions provided with test power having three different frequencies f; a second computing means (107) for obtaining a rational function by substituting the secondary winding resistance R2 as well as leakage inductance L corresponding to each of the test conditions in the rational function including a quadratic equation of a frequency f with the secondary winding resistance R2 as a denominator and the leakage inductance L as a numerator and computing the secondary winding resistance R2 as well as leakage inductance L by substituting a desired secondary slip frequency in this obtained rational function.

27 Claims, 16 Drawing Sheets

INDUCTION MOTOR CONTROLLER

TECHNICAL FIELD

The present invention relates to an induction motor controller for measuring electrical constants of a polyphase induction motor such as a primary resistance, a secondary resistance, and a leakage inductance by supplying a test power thereto with a polyphase inverter, setting a result of this measurement as parameters for driving control, and controlling driving of the polyphase induction motor.

BACKGROUND ART

For the purpose of controlling an induction motor with high precision, there is sometimes a case where such values as primary/secondary winding resistance, primary/secondary leakage inductance and mutual inductance which are electrical constants of the induction motor are required. FIG. 12 shows one of conventional technologies having functions of measuring those electrical constants and setting the constants in an induction motor controller.

FIG. 12 shows system configuration of a key section of an induction motor controller based on the conventional technology described in Japanese Patent Laid-Open Publication No. HEI 7-325132. In the figure, designated at the reference numeral 1 is an inverter, at 2 an induction motor, at 3 a current detector, at 4 a voltage detector, at 5 a magnetic flux torque control means, at 6 a no-load testing means, at 7 a DC testing means, at 8 (1) to 8 ($n$) a single-phase testing means respectively, at 9 a constant calculating means, at 10 a selector, and at 11 a setting storage means. The inverter 1 inputs a switching signal of output from the selector 10, operates according to the switching signal, and applies a voltage to the induction motor 2.

Next description is made for operations of measuring the secondary resistance as well as leakage inductance of this induction motor controller. The selector 10 successively selects output switching signals from a plurality of single-phase testing means 8 (1) to 8 ($n$), and outputs each of the selected signals to the inverter 1. A single-phase AC voltage is applied to a section between two terminals among three-phase input terminals with the induction motor 2 being at rest. Herein, it is assumed that frequencies of voltages each applied to the induction motor 2 are different from each other in n-pieces of single-phase testing means 8 (1) to 8 ($n$). Each of the single-phase testing means 8 (1) to 8 ($n$) inputs a current detected with the current detector 3 as well as a voltage detected with the voltage detector 4, obtains each magnitude as well as phase of those fundamental waves, obtains a sum (L011+L021) to (L01n+L02n) between primary and secondary leakage inductance and a sum (R11+R21) to (R1n+R2n) between primary and secondary winding resistance from those relations, and outputs the sums together with frequencies (F1 to Fn) of the voltage to the constant calculating means 9. Herein, it is assumed that the primary leakage inductance and the secondary leakage inductance are equal to each other, and that a half of the sum of the leakage inductance outputted from each of the single-phase testing means 8 (1) to 8 ($n$) is leakage inductance (L1 to Ln) of each of the single-phase testing means 8 (1) to 8 ($n$) respectively.

Further, it is assumed that the frequency changing property of leakage inductance is expressed by the following m-th-degree polynomial satisfying the condition of (m≦n-1) and including a frequency of an applied voltage as a variable:

$$L = A \cdot F^m + B \cdot F^{m-1} + \ldots + Z \quad (1)$$

Herein, the leakage inductance (L1 to Ln) measured for a frequency (F1 to Fn) is substituted in the equation (1) and factors A, B, and Z can be obtained based on a method of undetermined coefficients. Then, only the factor Z as a value of a 0-th degree may be computed because a value of a frequency 0 Hz is employed, so that computation is very simple. A value for the 0-th degree in this m-th-degree polynomial is assumed to be an estimated true value L of leakage inductance. Similarly, a value for the 0-th degree in this m-th-degree polynomial is assumed to be a true value R2 of secondary winding resistance by using the secondary winding resistance (R21 to R2n) measured for the frequency (F1 to Fn). As described above, the measurement is executed to reduce an error in measurement of secondary resistance as well as leakage inductance due to skin effect of a secondary conductor for an induction motor.

More detailed description is made herein for an influence by the skin effect. FIG. 13 is an explanatory view showing how a secondary resistance changes in accordance with a secondary frequency due to the skin effect, and shows a 3.7 KW-induction motor having a form of deep-slot secondary conductor as an example. Herein, FIG. 13($a$) is an explanatory view showing a correlation between a secondary frequency (Hz) and a secondary resistance (Ω), FIG. 13($b$) is an explanatory view showing an enlarged secondary-side range of the low-frequency section in FIG. 13($a$), in which the secondary resistance becomes large due to influence by the skin effect in accordance with increase in the secondary frequency as shown by the true value indicated by a heavy solid line. Indications of secondary approximation, tertiary approximation and quaternary approximation in the figure show curves each obtained by means of a polynomial approximation. FIG. 13($c$) is a view for explaining a problem on the curves obtained through the polynomial approximation. As understood from FIG. 13($b$), estimation can be made closer to the true value with a higher degree of the polynomial approximation. However, measurement for various frequencies is required in turn. This example shows the quaternary approximation and the error from the true value is very small.

The quaternary approximation #1 shown in FIG. 13($c$) shows a case where measurement for each frequency can be made through the quaternary approximation without an error, and the quaternary approximation #2 shows a result of estimation when an error of 0.005Ω occurs in the measurement for a frequency (22 Hz in the figure) at one point. In the secondary resistance value for 0 Hz, an error largely increases due to the error in measurement for the frequency at one point as shown in the figure. The above case indicates that, in the polynomial approximation, a slight amount of error in the measured value results in a greatly large error in an estimated resistance value in an area where measurement has not been made.

As slip in a normal operating state is small, a secondary frequency is only several Hz. The secondary frequency is 4 Hz when the induction motor used in this example is operating under the rated load.

Accordingly, the secondary resistance required in the normal operating state is only a value of several Hz.

However, an equivalent circuit for the induction motor is as shown in FIG. 14 which is well known, and a current hardly flows into the secondary resistance when a voltage of around several Hz is loaded, and flows through the mutual inductance M, so that the secondary resistance can not be measured with high precision, which makes it necessary to estimate a required frequency from a higher frequency than that in the normal operating state.

In brief, the secondary resistance for a low frequency required for a normal operation of the motor can not directly be measured for the same frequency, so that the secondary resistance for the normal operation thereof has to be estimated by using the secondary resistance value measured for a high frequency during the normal operation thereof.

It is possible to estimate a secondary resistance value for a frequency required for the normal operation thereof by means of the polynomial approximation, but for measurement with higher precision, it is necessary to measure the frequency five points or more and to make approximation by using the polynomial with a quaternary or high degree.

In addition, measurement precision for each frequency has to be extremely high, and any error included in the measurement results in a large error when a secondary resistance value for a frequency at the normal operation of the motor is estimated.

Description has been made for the secondary resistance, and the same is true for measurement of the leakage inductance.

FIG. 15 is a block diagram showing a conventional type of induction motor controller described in Japanese Patent Laid-Open Publication No. HEI 6-98595, and there is disclosed in the Publication a method of measuring a total resistance (R1+R2) of the primary and secondary resistance as well as a total leakage inductance (L1+L2) by applying a single-phase voltage to the motor.

In FIG. 15, designated at the reference numeral 21 is an AC power unit, at 22 a rectifier circuit, at 23 a smoothing capacitor, at 24 an inverter, at 25 an induction motor, and at 26 a current detector.

Also in the figure, designated at the reference numeral 27 is a gate circuit for generating a PWM signal, at 28 speed-sensorless vector control for controlling a speed so as to follow a speed command cor during the normal operation, at 29 excitation processing of a single-phase AC current for generating a sinusoidal-wave modulation signal, operating the inverter 24 through the gate circuit 27 with the generated signal, and passing an AC current to the induction motor 25 with an AC exciting voltage, at 30 computation processing of a current Iq for active power and a current Id for reactive power, and at 31 computation processing of primary/secondary-total resistance as well as total leakage inductance. The reference numeral 32 indicates a control circuit which includes the configuration with the reference numerals 28 to 31 assigned thereto. Herein, in the processing 30 for computing a current Iq for an active power and a current Id for a reactive power, assuming a U-phase motor current iu and θ as a rotational phase command from fixed coordinates for exciting voltage vectors, the current Iq for active power of 1.414·sin θ·iu is obtained by adding sampling values obtained at an arbitrary sampling cycle within a cycle of the primary frequency and dividing the sum by times of adding, while the current Id for reactive power of −1.414·cos θ·iu is obtained by adding the sampling values at an arbitrary sampling cycle within one cycle of the primary frequency and dividing the sum by times of adding.

Then, in the processing of computing a primary/secondary total resistance as well as a total leakage inductance, the primary/secondary-total resistance (R1+R2) and primary/secondary-total leakage inductance (L1+L2) are obtained with a primary frequency command ω1 and a primary voltage command value Vc1 for the inverter through the following equations:

$$(R1+R2)=Vc1 \cdot Iq/1.5(Id^2+Iq^2) \quad (2)$$

$$(L1+L2)=Vc1 \cdot Id/1.5\omega1(Id^2+Iq^2) \quad (3)$$

As described above, in the conventional type of induction motor controller shown in FIG. 15, primary/secondary-total resistance as well as leakage inductance are obtained by applying a single-phase voltage to the motor.

However, this computation generates some error due to the approximation based on assumption that the mutual inductance M is not present. Description is made herein for the error. A current flowing in from the primary side in a single-phase equivalent circuit shown in FIG. 14 is branched to the mutual inductance M and a serial circuit comprising the secondary leakage inductance and secondary resistance. Herein, if the approximation is made based on assumption that the mutual inductance M is not present, the computation will be carried out based on assumption that all the current passing through the mutual inductance M would pass through the serial circuit with the secondary leakage inductance and secondary resistance. The error due to approximation based on assumption that the mutual inductance M is not present results in that, assuming R1=0.4Ω, R2=0.3Ω, M=62 mH, L1=L2=1.6 mH, a secondary resistance value is computed around 5% as low as an ordinarily estimated value.

FIG. 16 is a block diagram showing a conventional type of induction motor controller described in Japanese Patent Laid-Open Publication No. HEI 4-364384, and there is especially disclosed herein a technology of estimating primary resistance R1 and secondary resistance R2 of the motor at the time of its activation.

In FIG. 16, a DC voltage signal generator 51 temporarily applies a DC voltage to a PWM inverter 41 through a switch 52 for a prespecified period of time immediately after a starting signal ST rises from zero until a magnetic-flux command Ψ* rises up to 50% thereof, and the PWM inverter 41 evenly applies a DC voltage to a motor 42 by controlling a pulse width. Then a starting current detecting means 57 detects a single-phase current (called as a starting current hereinafter) of the motor 42 with a current detector 44 after a prespecified period of time from when the PWM inverter 41 starts applying a DC voltage to the motor 42 until the magnetic-flux command Ψ* rises up to 50% thereof, and outputs the current to a resistance estimation computing device 55 through a low-pass filter 53 as well as a switch 54. Then, the resistance estimating means 55 receives the primary resistance R1n and secondary resistance R2n of the motor 42 when a temperature of the motor 42 is at the reference level, the primary resistance R1n and secondary resistance R2n which are outputs from the reference value storing device 56 for storing a starting current In outputted from the starting current detecting means 57 when temperature of the motor 42 is at the reference level, and a starting current I which is output from the starting current detecting means 57 in the state where there is not restriction over temperature of the motor 42, and estimates the primary resistance R1 and secondary resistance R2 of the motor 42 through the equations (4) and (5):

$$R1=\{Kr1(In-I)/I+1\}R1n \quad (4)$$

$$R2=\{Kr2(In-1)/I+1\}R2n \quad (5)$$

wherein Kr1 and Kr2 are coefficients for correction.

However, the induction motor controller shown in FIG. 16 detects a single-phase starting current of the motor 42 with the current detector 44 after a prespecified period of time from the point of time when application of a DC voltage is started to the motor 42 from the PWM inverter 41 until the magnetic flux command Ψ* rises up to 50% thereof, and estimates the resistance. As it is assumed in the controller that the primary resistance R1 and secondary resistance R2 are the same, the estimated primary resistance R1 and secondary resistance R2 are only values closer to the actual values as compared to the primary resistance R1n and secondary resistance R2n each in the reference temperature, and in addition an error is always included in the controller unless the temperature in the primary resistance and the temperature in the secondary resistance are always kept constant.

There have been the problems as described below in the conventional type of induction motor controller.

(1) It is required to sufficiently consider the skin effect to enhance measurement precision of a secondary resistance as well as a leakage inductance, but errors largely changes in the conventional type of method when the skin effect is taken into considerations.

In the conventional type of method for taking into considerations the skin effect, approximation is made with a polynomial, but with the polynomial, it has been required to make a degree of the polynomial higher for achieving high precision in the approximation. To make higher a degree of the polynomial, it is required to increase a number of frequency values to be measured, so that a long time is required for measurement thereof and computation for approximation through the polynomial is also complicated.

The approximation through a polynomial is generally made for obtaining a curve precisely passing on measured points, so that it is not appropriate to obtain a curve outside a measurement range like in a case where measurement in a range from, for example, 10 Hz to 60 Hz is made to obtain secondary resistance for 4 Hz as an estimated value of the secondary resistance. And for this reason, if even a slight amount of error is included in a measured value at each measured point, a curve outside the measurement range is largely displaced from the true value because the approximation curve is made from the measured values each including a error. Namely, to make approximation through a polynomial, no error is allowed in a measured value for each measured frequency, which is extremely difficult in the actual measurement.

(2) An error in estimation occurs because approximation is made based on assumption that the mutual inductance M is not present for obtaining a primary/secondary-total resistance as well as a total leakage inductance.

Conventionally, the approximation has been made assuming that the mutual inductance M is not present for obtaining a primary/secondary-total resistance as well as a total leakage inductance. But in the actual measurement, some of a current to be measured flows into the mutual inductance M, but the computation is made based on the assumption that also the portion of the current flows to the secondary resistance and secondary leakage inductance in the secondary side. Although this current value is small, an error of around 5% may be generated as an estimated value for secondary resistance. However, in order to obtain the value taking into considerations the mutual inductance M, calculation for convergence is required, which makes the computation very difficult.

(3) In the method of estimating a resistance value at the time of activation of a motor based on the conventional technology used for resolving shortage of a starting torque, an error becomes larger when a temperature in the primary resistance and that in the secondary resistance are not kept constant.

In the method of estimating a resistance value at the time of activation based on the conventional technology, the resistance is estimated by applying a DC voltage to the motor for activating it and observing a current value after a specified period of time from the activation. In the method for obtaining a primary resistance by applying a DC value and computing a resistance in accordance with the voltage and current after the sufficiently stable state is obtained as described above, the resistance value is computed through proportional calculation by making the fact that the current value changes due to effect by the resistance value even in the transitional state, but sometimes the change may not be proportional, and in that case a large error is included in the computed values. Also the secondary resistance is obtained through proportional calculation, and for this reason, when the temperature in the primary resistance and that in the secondary resistance vary, an error caused by change in the primary and secondary resistances is included in the obtained secondary resistance value.

Accordingly, the present invention has been made for solving the problems as described above, and a first object of the present invention is to provide an induction motor controller with improved control performance which does not require a long time for measurement and also makes it possible to precisely measure the secondary resistance as well as the leakage inductance by taking into considerations the skin effect with a few sampling frequency values, and a second object of the present invention is to provide an induction motor controller with improved control performance which makes it possible to reduce an error caused by the assumption that the mutual inductance is not present by taking into considerations the mutual inductance in measurement of a resistance as well as a mutual inductance and further allows easy computation of the secondary resistance value without requiring the convergence calculation or the like; and a third object of the present invention is to provide an induction motor controller with improved control performance which makes it possible to estimate the primary resistance and secondary resistance values not through proportional calculation but by directly and can reduce an error even when the temperature in the primary resistance is different from that in the secondary resistance.

DISCLOSURE OF INVENTION

In an induction motor controller according to the present invention, a first computing means computes a secondary winding resistance R2 and a leakage inductance L corresponding to each of test conditions with at least three types of test power each having a different frequency f; and a second computing means has a rational function including a quadratic equation for the frequency f with the secondary winding resistance R2 as a denominator and the leakage inductance L as a numerator, computes this rational function by substituting the secondary winding resistance R2 and leakage inductance L corresponding to each of the test conditions therein, and obtains the secondary winding resistance R2 and leakage inductance L by substituting a desired secondary slip frequency in this computed rational function, so that a secondary resistance as well as a leakage inductance based on consideration to the skin effect on the secondary slip frequency in an induction motor can easily be obtained by sampling at least three frequency values, and also a secondary resistance as well as a leakage inductance for the secondary slip frequency in the induction motor required for its actual operation can precisely be computed and measured, and further the measured values can be used for control in the actual operation, and for this reason, when a speed and torque are to be computed, the computing precision can be enhanced.

The induction motor controller according to the present invention computes secondary winding resistance R2 and leakage inductance L corresponding to each of test conditions with at least three types of test power each having a different frequency f, and the secondary winding resistance as well as the leakage inductance for secondary slip frequency in the induction motor required for its actual operation can be computed and measured with high precision by using the following simple rational functions:

$R2(f)=(a1+a2 \cdot f^2)/(1+a3 \cdot f^2)$ $L(f)=(b1+b2 \cdot f^2)/(1+b3 \cdot f^2)$ In the induction motor controller according to the present invention, the second computing means computes only factors a1 and b1, and obtains the secondary winding resistance R2 and leakage inductance L each corresponding to a low secondary slip frequency, so that a secondary resistance and a leakage inductance for a secondary slip frequency in the induction motor required for its actual operation can be computed and measured such with high precision and within a short time.

In the induction motor controller according to the present invention, the first computing means computes a first secondary winding resistance R2 for a prespecified frequency f, and the second computing means obtains a second secondary winding resistance R2 by substituting a prespecified frequency f in the rational function previously obtained by this second computing means and also obtains a third secondary winding resistance R2 by substituting a prespecified secondary slip frequency f in the rational function, and further obtains a required secondary winding resistance R2 by multiplying this third secondary winding resistance R2 by a ratio between the second secondary winding resistance R2 and the first secondary winding resistance R2, so that the secondary resistance and leakage inductance for a secondary slip frequency in the induction motor required for its actual operation can be computed and measured with high precision and within a shorter time.

In the induction motor controller according to the present invention, a power computing means computes active power P and reactive power Q corresponding to the test power with a frequency f; a first computing means obtains secondary resistance R2d and secondary leakage inductance L2d from a computing equation obtained by an L-type equivalent circuit from a phase voltage peak value Vp as well as a primary angular frequency ω corresponding to the frequency f, active power P as well as reactive power Q and primary winding resistance R1 having previously been measured; and a second computing means obtains a secondary winding resistance R2 and a secondary leakage inductance L by substituting the secondary winding resistance R2d as well as the secondary leakage inductance L2d having been obtained by the first computing means and secondary self inductance LL2 having previously been measured in each of computing equations of the secondary winding resistance R2 and the secondary leakage inductance L having been obtained by a T-type equivalent circuit respectively, so that computing taking into considerations the mutual inductance can be obtained without using calculation for convergence or the like when the secondary winding resistance as well as leakage inductance are calculated by using the active power and reactive power, and for this reason a time and efforts for making a complicated programming such as calculation for convergence can be omitted, and further errors in computation and measurement of the secondary winding resistance and leakage inductance can be reduced because the mutual inductance is taken into considerations.

In the induction motor controller according to the present invention, the computing equations obtained by the L-type equivalent circuit are as follows:

$L2d=Q \cdot Vp^2/(4 \cdot \omega \cdot (P^2+Q^2))$ $R2d=P \cdot Vp^2/(2 \cdot (P^2+Q^2))-R1$ while the computing equations obtained by the T-type equivalent circuit are as follows:

$L=L2d+(2 \cdot L2d-LL2) \cdot R2d^2/(2 \cdot \omega^2 \cdot LL2^2)$ $R2=R2d \cdot LL2^2/(LL2-L2d)^2$ so that computing taking into considerations the mutual inductance can be executed through easy calculation without using the convergence calculation.

In the induction motor controller according to the present invention, the power computing means computes a momentarily active power as well as a momentarily reactive power from an applied voltage of a single-phase current supplied to the polyphase induction motor by the polyphase inverter, and filters a high frequency element from the momentarily active power as well as from the momentarily reactive power, so that the active power as well as the reactive power can be measured with high precision without giving any restricting to the motor.

In the induction motor controller according to the present invention, the power computing means filters a frequency element twice as high as that of the applied voltage with a notch filter from the momentarily active power as well as from the momentarily reactive power, and also filters a high frequency element exceeding the twice-high frequency element with a low-pass filter, so that the active power as well as the reactive power can be measured with higher precision.

In the induction motor controller according to the present invention, a test power commanding means outputs a command voltage to a polyphase inverter so that the polyphase inverter supplies a specified effective value current to the polyphase induction motor, so that a secondary winding resistance as well as a leakage inductance, each of which changes according to the effective-value current value, corresponding to an effective-value current value for its actual operation can be measured with high precision.

In the induction motor controller according to the present invention, the test power commanding means increases a command voltage to the polyphase inverter at a specified rise rate, and stops increasing the command voltage when an average value of a time obtained by squaring an effective value current supplied to the polyphase induction motor by the polyphase inverter in accordance with the rise of this command voltage is equal to ⅓ of the specified effective value current or larger, so that an effective value current required for measurement of active power and reactive power can easily be set.

In the induction motor controller according to the present invention, the test power commanding means outputs a command voltage to a polyphase inverter, and the power computing means computes active power P as well as reactive power Q by correcting a phase of the command voltage based on a corrected phase corresponding to a delay due to measurement and computation, so that a phase difference of the command voltage effecting on a result of measuring active power and reactive power can be corrected, and for this reason an active power and a reactive power can accurately be measured without any change in a result of measuring the active power and reactive power due to a sampling cycle and a delay time in computation.

In the induction motor controller according to the present invention, a current control means controls the polyphase inverter and applies a preset DC command voltage to the polyphase induction motor being at rest to supply a DC current thereto, and a resistance estimating means inputs thereto the DC voltage and the DC current, computes a total resistance of primary winding resistance and secondary winding resistance in a first period immediately after the supply of the current by the current control means, computes the primary winding resistance in a second period following the first period, subtracts the primary winding resistance computed in the second period from the total resistance having been computed in the first period and estimates the secondary winding resistance, so that primary winding resistance and secondary winding resistance can be estimated within a short period of time in activation of the motor, and by estimating each resistance for each of its activation, shortage of torque can be avoided in the activation even if the primary winding resistance and secondary winding resistance are changed due to changes in temperature. Also, the primary winding resistance and secondary winding resistance in each temperature can be obtained even if the temperature in the primary winding resistance is different from that in the secondary winding resistance.

In the induction motor controller according to the present invention, the resistance estimating means comprises a voltage estimating device for estimating a DC voltage value applied to the polyphase induction motor from the DC current supplied to the polyphase induction motor, a known circuit constant of the polyphase induction motor, and from the fed-back primary winding resistance as well as secondary winding resistance; an integrator for integrating deviations between the DC voltage value and DC voltage command value; and a resistance computing means for computing total resistance of the primary winding and the secondary winding in the first period based on output from this integrator, separating the total resistance to the primary winding resistance and the secondary winding resistance, which are to be fed back to the voltage estimating device, computing the primary winding resistance in the second period based on output from the integrator, subtracting the primary winding resistance measured in the second period from the total resistance having been computed in the first period and estimating the secondary winding resistance, and feeding back the computed primary winding resistance as well as the estimated secondary winding resistance to the voltage estimating device; and the resistance estimating means controls the polyphase induction motor by using the primary winding resistance as well as secondary winding resistance measured and estimated in the second period when the deviation becomes the specified value or less, so that resistance values can be estimated with high precision.

In the induction motor controller according to the present invention, the resistance estimating means comprises a current estimating device for estimating a DC current value supplied to the polyphase induction motor from the DC command voltage commanded to the polyphase induction motor, a known circuit constant of the polyphase induction motor, and from the fed-back primary winding resistance as well as the secondary winding resistance; a computing device for integrating deviations between the DC current value and a detected value of a DC current supplied to the polyphase induction motor; and a resistance computing means for computing a total resistance of the primary winding and the secondary winding in the first period based on output from this integrator, separating the total resistance to the primary winding resistance and the secondary winding resistance which are to be fed back to the voltage estimating device, computing the primary winding resistance in the second period based on output from the integrator, subtracting the primary winding resistance measured in the second period from the total resistance having been computed in the first period, estimating the secondary winding resistance and feeding back the computed primary winding resistance as well as the estimated secondary winding resistance to the current estimating device; and the resistance estimating means controls the polyphase induction motor by using the primary winding resistance as well as secondary winding resistance measured and estimated in the second period when the deviation becomes the specified value or less, so that resistance values can be estimated with high precision.

In the induction motor controller according to the present invention, the resistance computing means separates the total resistance computed in the first period to the primary winding resistance and the secondary winding resistance at a prespecified ratio, so that by using a prespecified ratio between the primary winding resistance and secondary winding resistance, a time required for estimating resistance when the ratio is not known can be prevented from being longer.

The induction motor controller according to the present invention further comprises a storage means for storing therein a ratio between the primary winding resistance R1 as well as the secondary winding resistance R2 due to AC current application obtained by previously applying an AC voltage to the polyphase inductance motor and the primary winding resistance R1 as well as the secondary winding resistance R2 due to DC voltage application estimated at substantially the same time by the resistance estimating means; and the controller corrects the primary winding resistance R1 as well as the secondary winding resistance R2 having been estimated by the resistance estimating means at the ratio stored in the storage means, so that resistance in activation of the motor can be estimated with higher precision.

The induction motor controller according to the present invention controls a polyphase induction motor by estimating primary winding resistance and secondary winding resistance in a stopping period of the polyphase induction motor which repeats an operating period and a stopping period, so that changes in resistance in accordance with fluctuations in temperature of the windings due to the motor's being operating and stopping can be estimated, and for this reason a resistance in activation of the motor can be estimated with higher precision.

BRIEF DESCRIPTION OF DRAWINGS

FIG. 1 to FIG. 11 are views showing preferred embodiments of the present invention, and FIG. 1 is a block diagram showing an induction motor controller according to Embodiment 1 of the present invention, FIG. 2 is an equivalent circuit diagram of an induction motor of which secondary conductor has a form of a double squirrel cage, FIG. 3 is a block diagram showing the induction motor controller according to the present invention which obtains secondary resistance as well as leakage inductance by taking into considerations the mutual inductance, FIG. 4, including FIG. 4(a) and FIG. 4(b), shows equivalent circuit diagrams for the induction motor controlled by the induction motor controller according to the present invention, FIG. 4(a) is an L-type equivalent circuit diagram where approximation is made based on assumption that the mutual inductance M is not present, and FIG. 4(b) is a T-type equivalent circuit diagram where the mutual inductance M is considered.

FIG. 5 is a block diagram showing a test power commanding means and a power computing means for computing secondary resistance as well as leakage inductance through application of a single-phase voltage in the induction motor controller according to the present invention, FIG. 6 is a block diagram showing a test power commanding means and a power computing means for computing active power and reactive power with a specified current in the induction motor controller according to the present invention, FIG. 7 is a block diagram showing a test power commanding means and a power computing means for the induction motor controller according to the present invention, FIG. 8 is a block diagram showing an induction motor controller according to Embodiment 2 of the present invention, FIG. 9, including FIG. 10 is a block diagram showing another type of induction motor controller according to Embodiment 2 of the present invention, FIG. 11 is an explanatory view showing a result of estimating resistance values of the induction motor controller according to Embodiment 2 of the present invention.

BEST MODE FOR CARRYING OUT THE INVENTION

Embodiment 1

Figure 1:
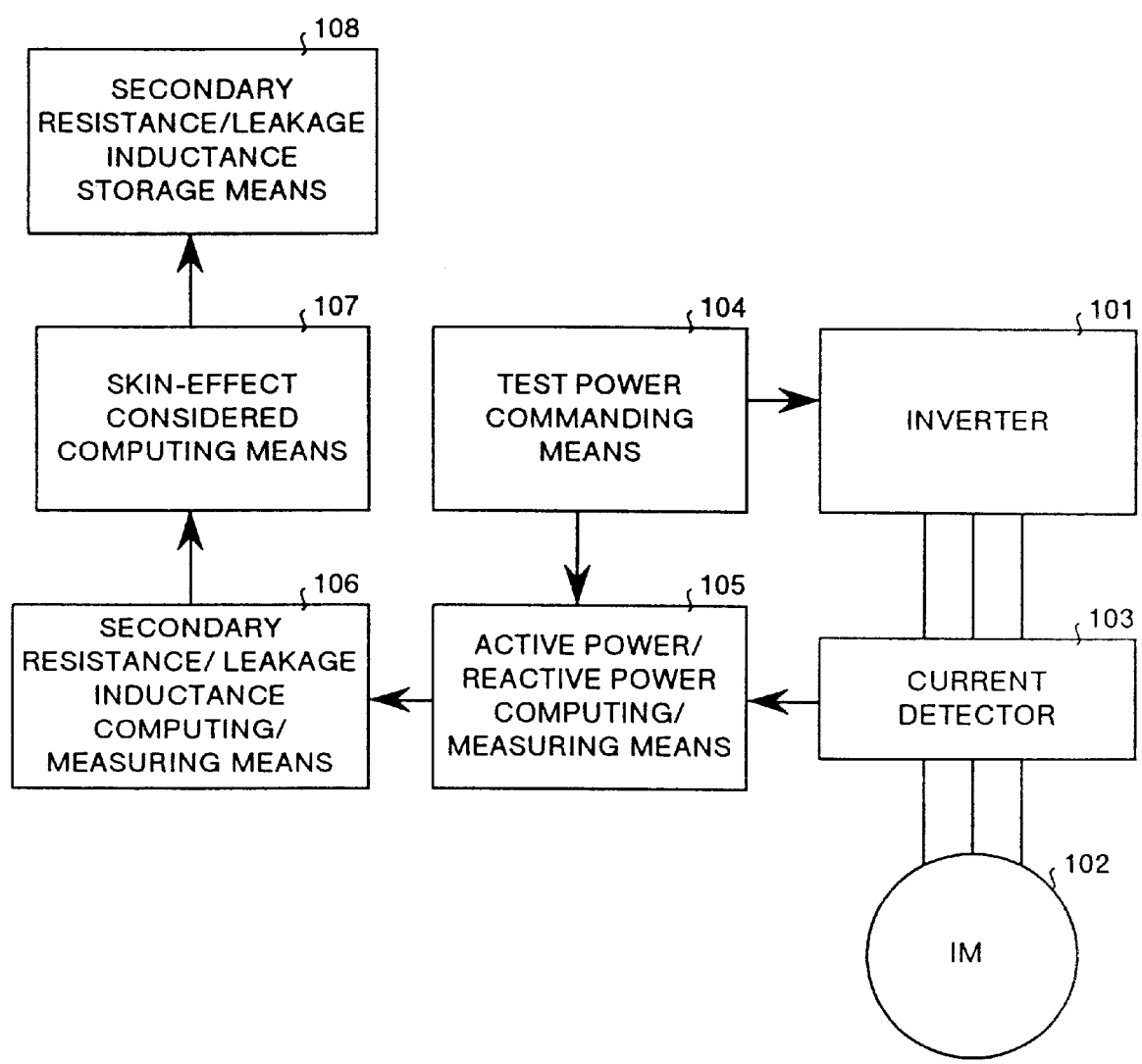

FIG. 1 is a block diagram showing an induction motor controller according to Embodiment 1 of the present invention. In FIG. 1, designated at the reference numeral 101 is an inverter, at 102 an induction motor, at 103 a current detector for detecting a current supplied from the inverter 101 to the induction motor 102, and at 104 a test power commanding means for commanding a test power to be applied from the inverter 101 to the induction motor 102 and successively outputting command voltages for three different frequencies. Also in the figure, designated at the reference numeral 105 is an active power/reactive power computing/measuring means (described as a power computing means hereinafter) for computing and measuring active power P and reactive power Q by using the current detected by the current detector 103 and command voltages from the test power commanding means 104, at 106 a secondary resistance/leakage inductance computing/measuring means for computing and measuring a secondary resistance R2 as well as a leakage inductance L using a result of measurement by the power computing means 105, and at 107 a skin-effect considered computing means for computing values each taking into considerations the skin effect by using values of secondary resistance as well as leakage inductance corresponding to command voltages for three different frequencies outputted from the secondary resistance/leakage inductance computing/measuring means 106. Also, the reference numeral 108 indicates a secondary resistance/leakage inductance storage means for storing therein values outputted from the skin-effect considered computing means 107 to be used in an actual operation of the motor.

Next description is made for operations of the skin-effect considered computing means 107 for this induction motor controller.

As described in "BACKGROUND ART", the secondary resistance changes depending on a secondary slip frequency due to the skin effect. How the resistance changes is more or less different depending on a slot shape of a cage rotor, but it is found through experiments of the frequency versus secondary resistance that the influence of skin effect caused by various forms of secondary conductor is expressed with a rational function including a quadratic equation for a frequency f in both the denominator and numerator. This rational function is expressed as follows:

$$R2(f) = (k1 + k2 \cdot f^2)/(k3 + k4 \cdot f^2) \tag{6}$$

wherein f is a frequency, and k1 to k4 are constants.

Assuming in the equation (6) that a1=k1/k3, a2=k2/k3, and a3=k4/k3, the rational function will be as follows:

$$R2(f) = (a1 + a2 \cdot f^2)/(1 + a3 \cdot f^2) \tag{7}$$

Figure 2:
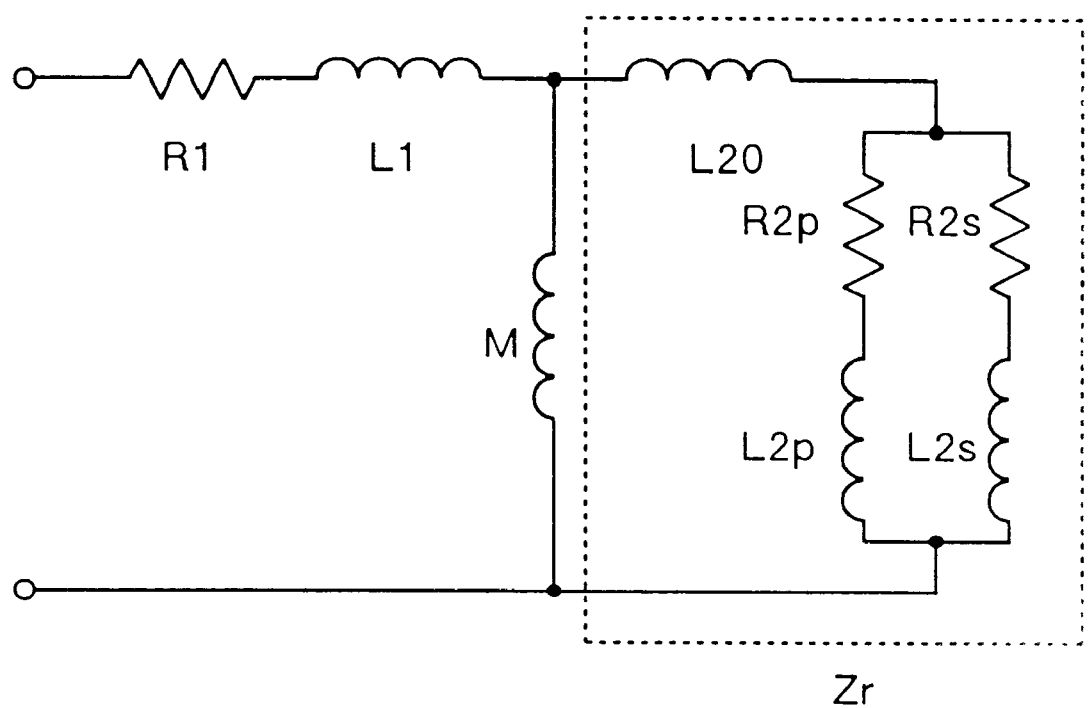

Herein, an equivalent circuit of the induction motor with a cage-shaped rotor having, for example, a double cage-shaped slot is as shown in FIG. 2. In the figure, designated at the reference sign L20 is a secondary-side shared leakage inductance, at R2p a resistance value of a upper-side conductor of the double cage, at R2s a resistance value of a lower-side conductor of the double cage, at L2p leakage inductance of the upper-side conductor of the double cage, at L2s leakage inductance of the lower-side conductor of the double cage, and at Zr a secondary-side total impedance. This secondary-side total impedance Zr is expressed as the following equation:

$$Zr = \frac{R2p^2 \cdot R2s + R2p \cdot R2s^2 + (L2s^2 \cdot R2p + L2p^2 \cdot R2s) \cdot (2\pi f)^2}{(R2p + R2s)^2 + (L2p + L2s)^2 \cdot (2\pi f)^2} + jw \left\{ L20 + \frac{L2s \cdot R2p^2 + L2p \cdot R2s^2 + (L2p^2 \cdot L2s + L2p \cdot L2s) \cdot (2\pi f)^2}{(R2p + R2s)^2 + (L2p + L2s)^2 \cdot (2\pi f)^2} \right\} \tag{8}$$

It can be seen from the equation (8) that the real part and the imaginary part of the equation indicate characteristics of the rational function including a quadratic equation for a frequency f in each of the parts. A secondary conductor is handled as a serial circuit with a resistance and a leakage inductance for controls by the induction motor 102, so that the real part of the secondary total impedance Zr is handled as the secondary resistance and the imaginary part thereof is handled as the secondary leakage inductance. Accordingly, it is also logically understood that, in the double cage, the secondary resistance as well as leakage inductance due to the secondary-side frequency can be expressed with a rational function including a quadratic equation for a frequency f.

As described above, assuming that the secondary resistance as well as leakage inductance can be expressed with a rational function including a quadratic equation for a frequency f, and if values of secondary resistance R2(f1), R2(f2), and R2(f3) corresponding to the three frequencies f1, f2, and f3 are found out, factors a1, a2, and a3 can be obtained through algebraic calculation. When the factors are obtained as described above, the secondary resistance for a low frequency such as several Hz incapable of being measured can easily be computed.

The description above has been made for the secondary resistance, and the same is true for computing of the leakage inductance.

The case where the slot of secondary conductor has a form of a double cage was described above for logical description, and it has been found that the case of a deep-slot form can also be expressed with the rational function described above.

Although a secondary resistance and a leakage inductance may be expressed by rational functions each including a quadratic equation as well as a biquadratic equation for a frequency f, the number of factors is five, which requires five factors to be obtained from values of secondary resistance R2(f1), R2(f2), R2(f3), R2(f4), and R2(f5) for five frequencies f1, f2, f3, f4, and f5, and for this reason, the computation is complicated so that a long time is required for estimation of resistance. In the experiments described above, it was found out that the secondary resistance and leakage reactance can be estimated with sufficiently high precision through a rational function including a quadratic equation for a frequency f.

Next description is made for operations of the induction motor controller according to Embodiment 1.

In FIG. 1, command voltages for three frequencies of 60 Hz, 35 Hz, and 10 Hz are successively outputted from the test power commanding means 104. An active power and a reactive power are obtained in the power computing means 105 with command voltages for the frequencies from the test power commanding means 104 as well as with output from the current detector 103.

In this case, the test power may be of either a three-phase sinusoidal wave or a single-phase sinusoidal wave.

However, in a case of the three-phase sinusoidal wave, if a command for 10 Hz frequency is outputted, the induction motor 102 immediately starts its rotation, so that the secondary resistance can not be measured. Accordingly, when the three-phase sinusoidal wave is used, it is required to select a frequency higher than 10 Hz so that the rotation will not be started during measurement of the secondary resistance and leakage reactance for the frequency. This frequency can be selected as required depending on a type of load and a magnitude of the load. Also, the frequency can be measured by restricting a rotary shaft of the induction motor 102 under certain conditions for use. Ina case of a single-phase current, the motor does not start its rotation even for 10 Hz, so that the single-phase voltage should preferably be applied to the motor. Also, the command voltages outputted from the test power commanding means 104 were used in the above experiments for computing/measuring an active power and a reactive power, but a voltage detected by the terminal side of the induction motor with a voltage detector provided therein may be used for the same purpose.

When an active power and a reactive power are obtained as described above, a secondary resistance and a leakage inductance can be computed. Herein, assuming that values of secondary resistance for 60 Hz, 35 Hz, and 10 Hz are R2(60), R2(35), and R2(10), and values of leakage inductance therefor are L(60), L(35), and L(10), factors of rational functions are obtained as follows:

$a1=\{-19 \cdot R2(60) \cdot R2(35)+343 \cdot R2(60) \cdot R2(10)-324 \cdot R2(35) \cdot R2(10)\}/$
$\{324 \cdot R2(60)-343 \cdot R2(35)+19 \cdot R2(10)\}$ $a2=\{19 \cdot R2(60) \cdot R2(35)-28 \cdot R2(60) \cdot R2(10)+9 \cdot R2(35) \cdot R2(10)\}/$
$\{100 \cdot (324 \cdot R2(60)-343 \cdot R2(35)+19 \cdot R2(10))\}$ $a3=\{-9 \cdot R2(60)+28 \cdot R2(35)-19 \cdot R2(10)\}/\{100 \cdot (324 \cdot R2(60)-343 \cdot R2(35)+19 \cdot R2(10))\}$ Assuming that a slip frequency for a rating torque of an induction motor to be used is 4 Hz, and when secondary resistance R2 at that time is precisely set, the secondary resistance R2 for 4 Hz can be obtained through the equation (7) by using the factors described above.

Figure 13A:
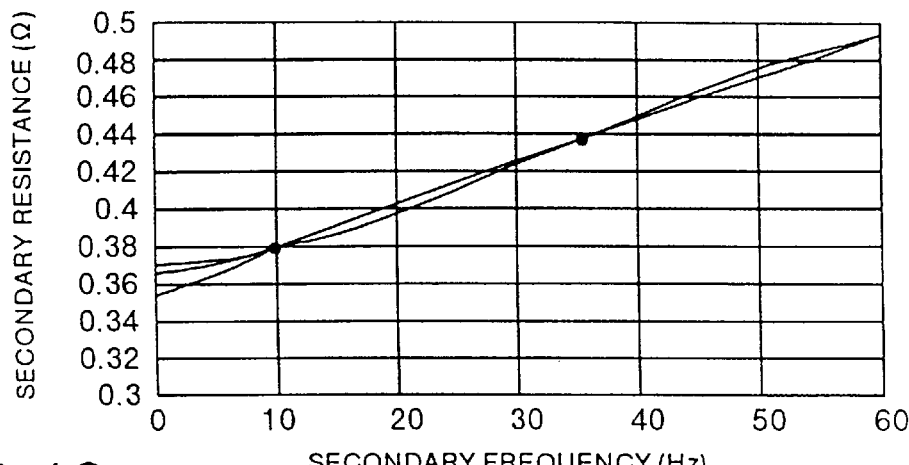
FIG. 13(a), FIG. 13(b) and FIG. 13(c), shows a method of considering the skin effect based on the conventional technology.
Figure 13B:
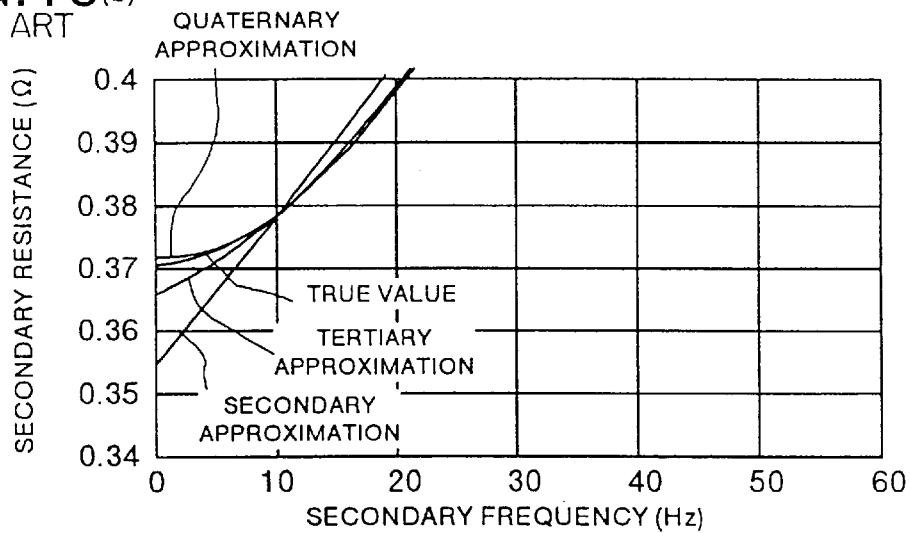
Figure 13C:
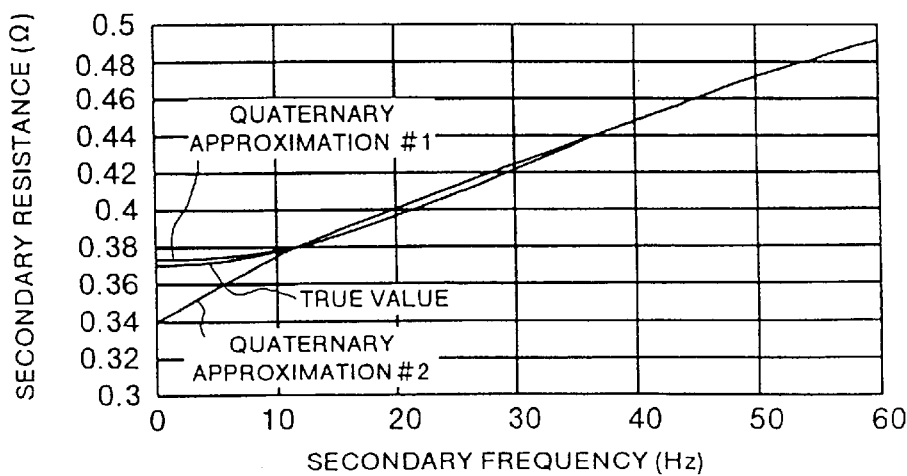
Figure 14:
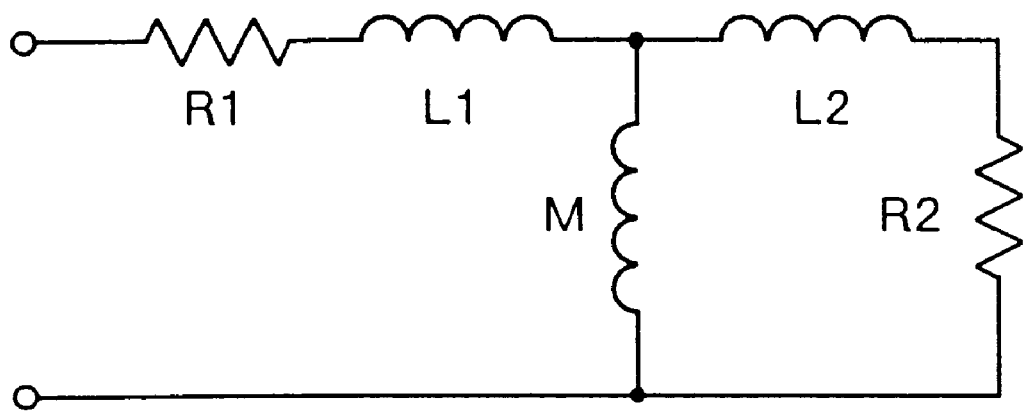
FIG. 14 is an equivalent circuit diagram of the induction motor.
Figure 15:
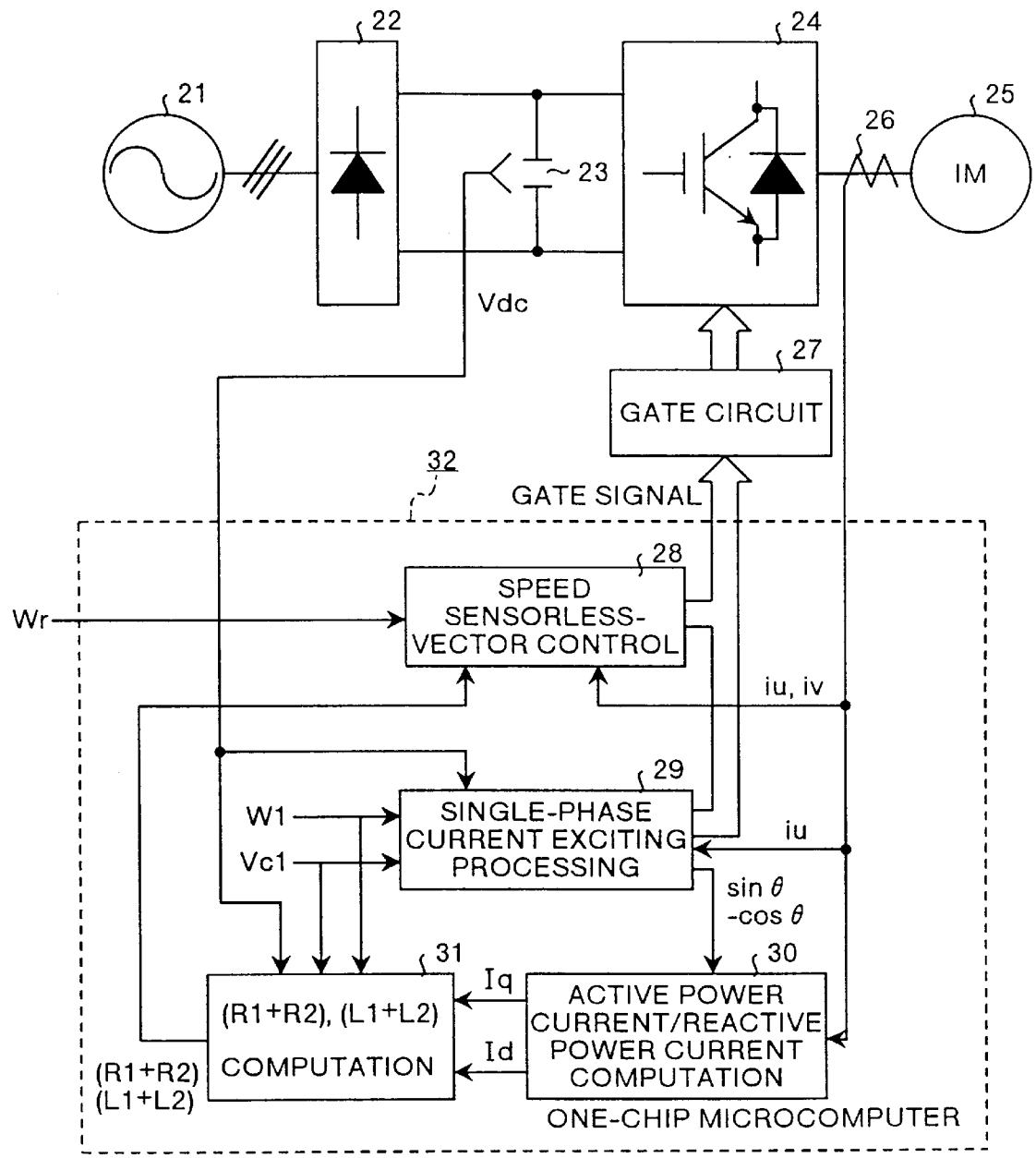
FIG. 15 is a block diagram showing the conventional type of induction motor controller having a function of measuring constants based on a single phase.
Figure 16:
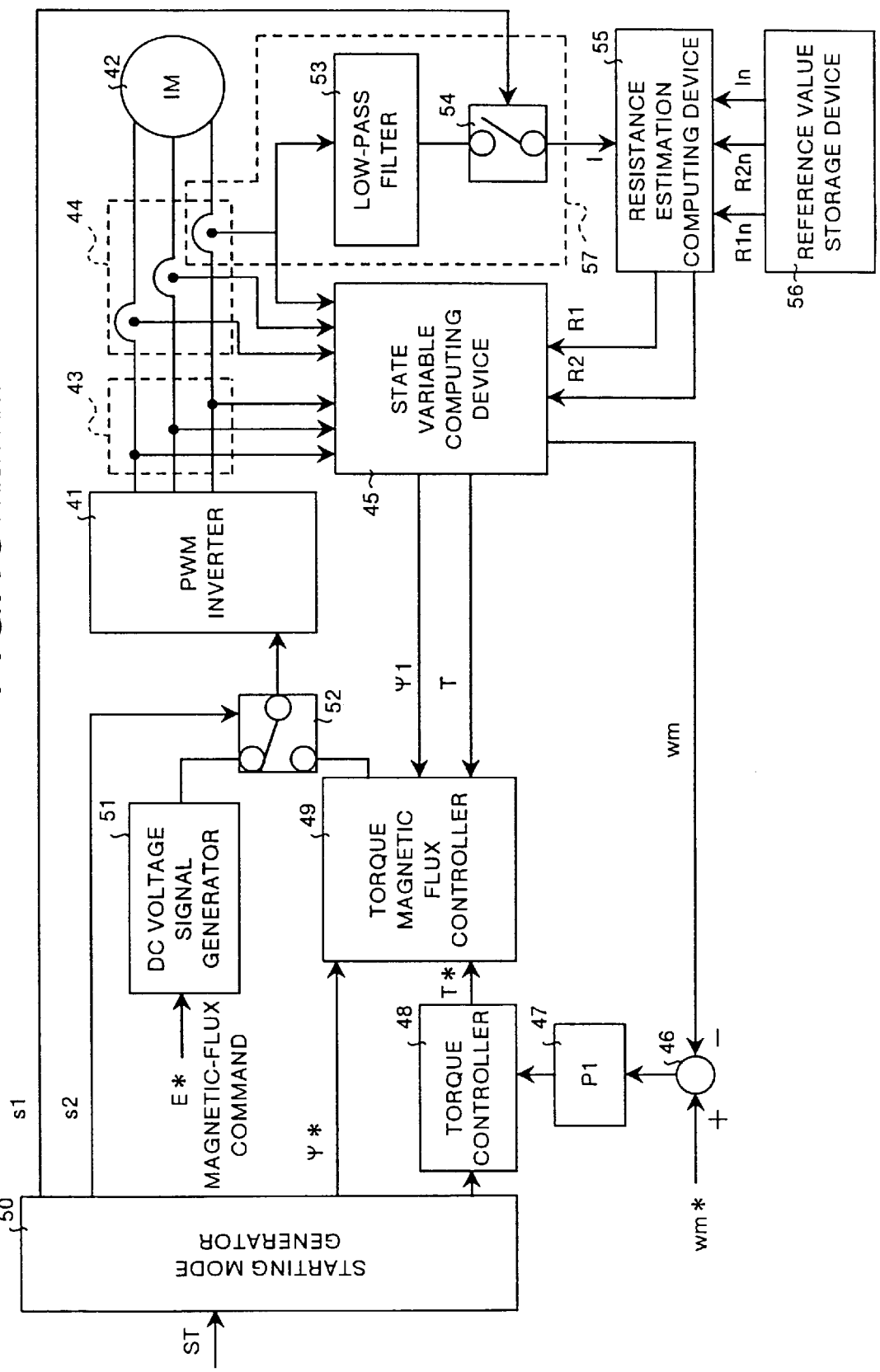
FIG. 16 is a block diagram showing the conventional type of induction motor controller having a function of measuring resistance at the time of motor's activation.

The secondary resistance for 5 Hz or less as shown in the example in FIG. 13 does not change so much. In this case, a value of f=0 may be used. When the value is used, R2(0)=a1 is obtained as understood from the equation (7), so that a2 and a3 do not need to be obtained, which allows troublesome computation to be omitted.

The same is true for the leakage inductance.

The secondary resistance and leakage inductance obtained as described above are stored in the secondary resistance/leakage inductance storage means 108 in FIG. 1 and used in an actual operation of the motor.

<Measurement of R2, L Taking into Considerations Mutual Inductance>

Figure 3:
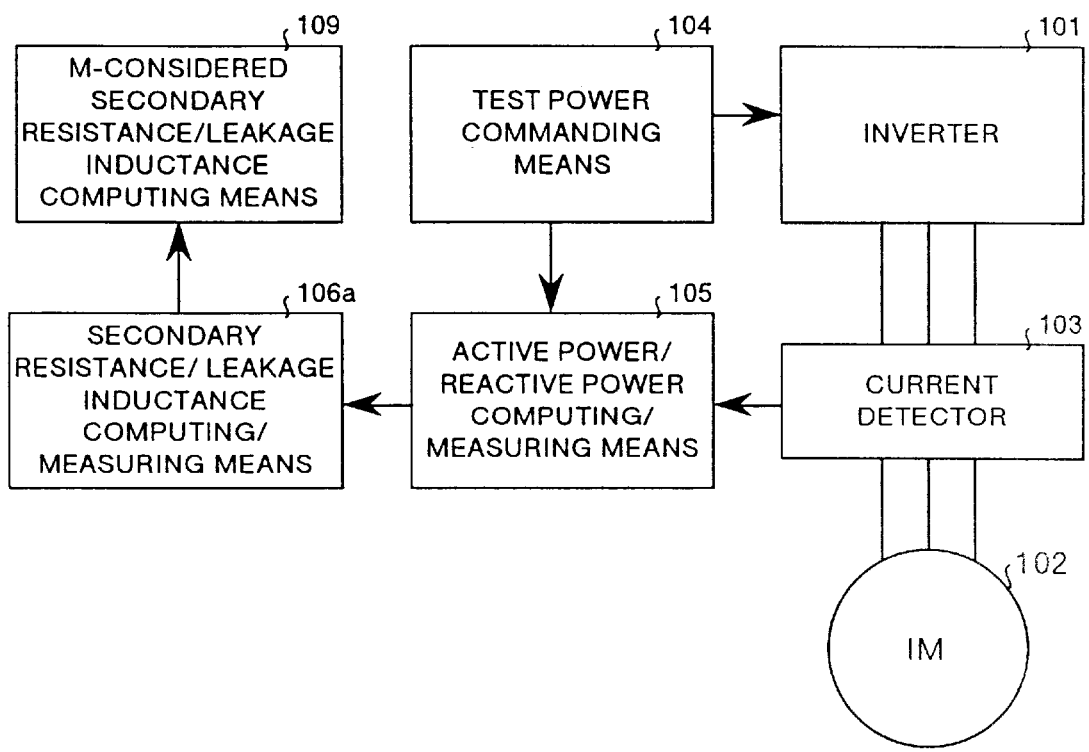
Figure 4:
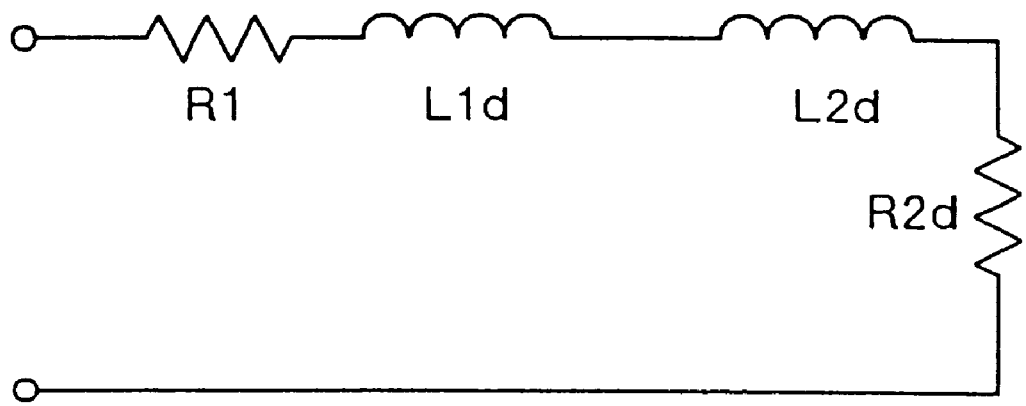
Figure 4:
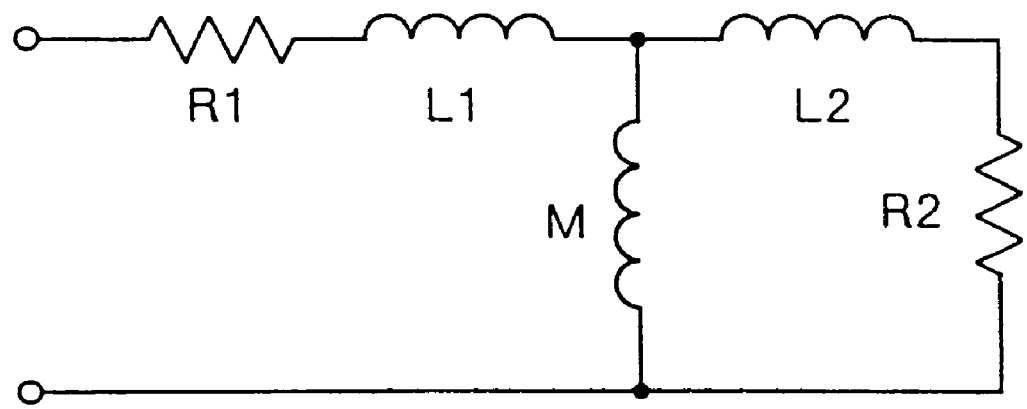

Next description is made for the induction motor controller for computing a secondary resistance as well as a leakage inductance with high precision taking into considerations the mutual inductance M with the secondary resistance/leakage inductance computing/measuring means 106 shown in FIG. 1. FIG. 3 is a block diagram showing the induction motor controller for measuring a secondary resistance and a leakage inductance taking into considerations the mutual inductance. FIG. 4 is an explanatory view of a single-phase equivalent circuit of the induction motor 102, and FIG. 4($a$) shows an L-type equivalent circuit based on assumption that the mutual inductance M is not present, while FIG. 4($b$) shows a T-type equivalent circuit where the mutual inductance M is considered.

In FIG. 3, designated at the reference numeral 106$a$ is a secondary resistance/leakage inductance computing/measuring means for measuring a secondary resistance as well as a leakage inductance for a desired frequency with the L-type equivalent circuit, and at 109 an M-considered secondary resistance/leakage inductance computing/measuring means for computing a secondary resistance as well as a leakage inductance taking into considerations the mutual inductance M.

Next description is made for operations of this induction motor controller. In the L-type equivalent circuit shown in FIG. 4($a$), impedance Zd when approximation is made based on assumption that the mutual inductance M is not present is expressed as follows:

$$Zd=(R1+R2d)+j\omega(L1d+L2d) \quad (9)$$

wherein the primary resistance R1 can previously be obtained with precision, but values of the secondary resistance and primary/secondary leakage inductance are different from actual values because the mutual inductance M has not been considered, so that, for the purpose of indicating the fact, the values are described as R2d, L1d, and L2d by adding thereto an attachment d. Herein, ω is a frequency angular speed for a frequency f.

In contrast, the T-type equivalent circuit when the mutual inductance M is taken into considerations is as shown in FIG. 4($b$), and impedance Z0 is expressed as follows:

$Z0=(R1+M^2\omega^2 R2/(R2^2+\omega^2 LL2^2))+j\omega\{L1+M(R2^2+\omega^2 L2LL2^2)/(R2^2+$ $\omega^2 LL2^2)\}$ \quad (10)

Herein LL2 is a secondary self inductance and LL2=M+L2, so that LL2 is obtained with a known method.

At first, the secondary resistance/leakage inductance computing/measuring means 106a obtains values R2d and L1d+L2d as follows with a calculating method often used for the case where approximation is made based on assumption that the mutual inductance M is not present.

$$R2d=P/I^2-R1 \quad (11)$$

$$L1d+L2d=Q/\omega I \quad (12)$$

Herein P is active power, Q is reactive power, and I is a phase-current effective value.

The phase-current effective value can be obtained by computing from a momentary current, but also can easily be obtained through the following equation.

$$I^2=(P^2+Q^2)/(Vp^2/2) \quad (13)$$

wherein VP is a phase-voltage peak value, which is a constant easily obtained if a command voltage is equivalent to an actual voltage. If it is assumed that values of primary and secondary leakage inductance are equal to each other, the following equations are obtained from the equation for a current above:

$$R2d=P\cdot Vp^2/(2\cdot(P^2+Q_2)) \quad (14)$$

$$L2d=Q\cdot Vp^2/(4\cdot\omega\cdot(P^2+Q^2)) \quad (15)$$

It is also assumed that values of primary and secondary leakage inductance are equal to each other when the mutual inductance M is taken into considerations, namely it is assumed that L1=L2=L. The M-considered secondary resistance/leakage inductance computing/measuring means 109 obtains the secondary resistance R2 and leakage inductance L taking into considerations the mutual inductance N as follows from the values R2d and L2d obtained through approximation based on assumption that the mutual inductance M is not present with the secondary resistance/leakage inductance computing/measuring means 106a. From the comparison between the impedances Zd and Z0, the following equations are obtained:

$$R2d=M^2\omega^2 R2/(R2^2+\omega^2 LL2^2) \quad (16)$$

$$L2d\cdot 2=L+M(R2^2+\omega^2\cdot L\cdot LL2)/(R2^2+\omega^2 LL2^2) \quad (17)$$

In order to obtain values R2 and L taking into considerations the mutual inductance M from those two equations, calculation for convergence is required, but programming therefor is quite complicated in its actual use, and for this reason, approximation such as $(R2/LL2)/\omega\approx 0$ is made assuming that secondary time constants R2/LL2 of the induction rotor 102 are sufficiently smaller than an angular frequency $\omega$, and the secondary resistance R2 and leakage inductance L based on considerations to the mutual inductance M are obtained from the values R2d as well as L2d obtained through approximation based on assumption that the mutual inductance M is not present with the following equations.

$$R2=R2d\cdot LL2^2/(LL2-L2d)^2 \quad (18)$$

$$L=L2d+(2\cdot L2d-LL2)\cdot R2d^2/(2\cdot\omega^2\cdot LL2^2) \quad (19)$$

The secondary resistance R2 and leakage inductance L based on considerations to the mutual inductance M for a desired frequency f can be obtained by using the equations (18) and (19), and for this reason an error due to the conventional type of method in which approximation is made based on assumption that the mutual inductance M is not present can be eliminated.

<Measurement of R2, L by Applying Single-phase Voltage>

Figure 5:
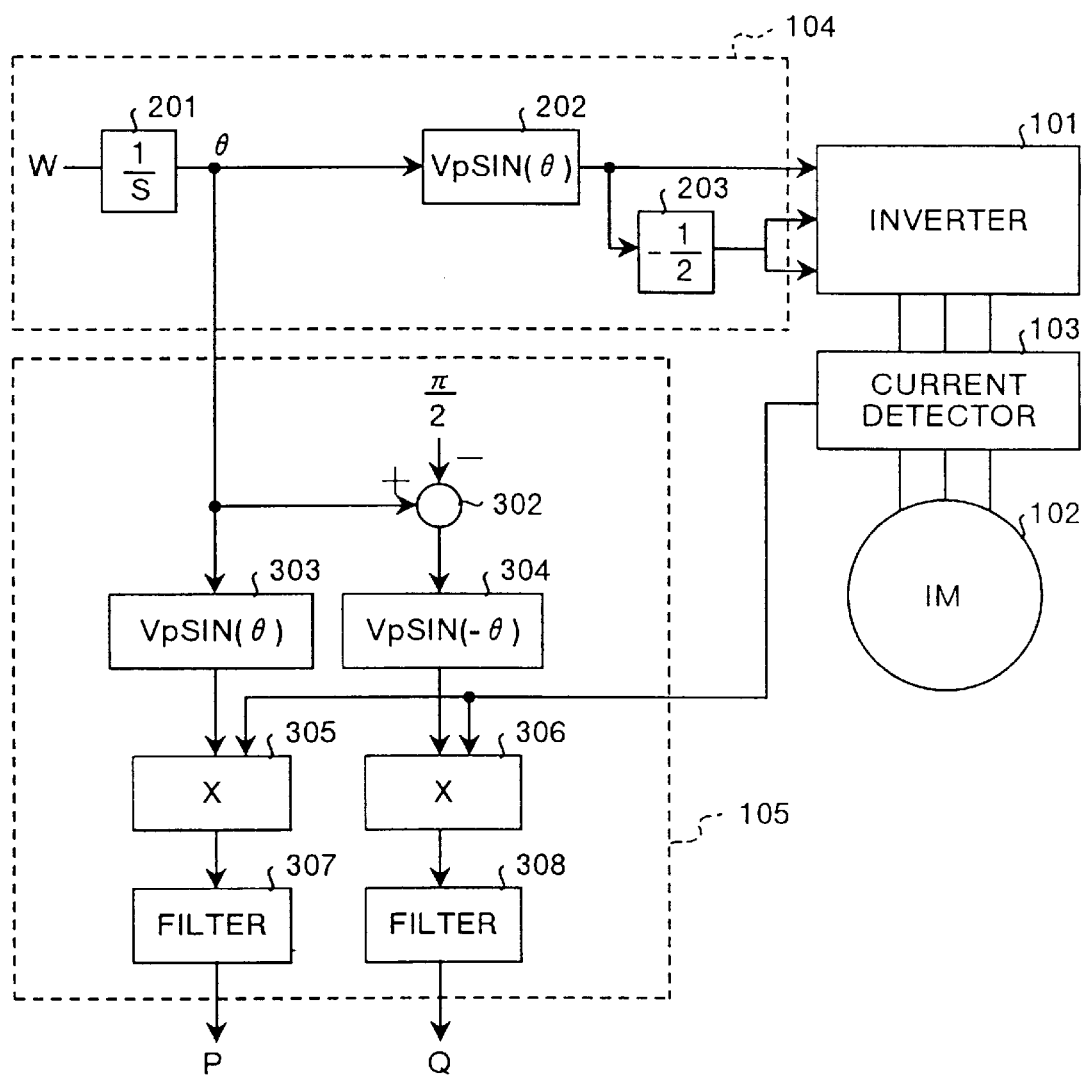

Next description is made for the induction motor controller for applying a single-phase voltage thereto and computing active power P and reactive power Q required for obtaining a secondary resistance R2 and a leakage inductance L. FIG. 5 is a block diagram showing a test power commanding means 104 and a power computing means 105 for computing active power P as well as reactive power Q by applying a single-phase voltage. In FIG. 5, the reference numeral 104 indicates the test power commanding means for applying a single-phase voltage for testing, and the means comprises an integrator 201 for integrating angular frequencies $\omega$ of a voltage to be applied and obtaining a phase $\theta$, a SIN-function generator 202 for outputting VpSIN ($\theta$), and a gain 203. The reference numeral 105 indicates the power computing means, which comprises an adder 302 for subtracting $\pi/2$ from the phase $\theta$, SIN-function generators 303, 304, multipliers 305, 306, and filters 307 and 308.

Next description is made for operations of this induction motor controller. To the induction motor 102 having three phases: U phase, V phase, and W phase, the following methods are available: one for applying vs=Vp·SIN($\theta$) to the U phase, −vs to the V phase, and 0 to the W phase; and another one for applying vs=Vp·SIN($\theta$) to the U phase, and −vs/2 to the V phase as well as to the W phase. Herein Vp is a voltage peak value which is a constant value. The induction motor does not rotate in either of the methods. When the test power commanding means 104 applies a single-phase voltage as described above, a detected current "is" is expressed as is=Ip·SIN($\theta$−$\Phi$). ($\Phi$: a phase difference between a current and a voltage) At this point of time, momentarily active power "vs·is" obtained as follows:

$$vs\cdot is = Vp\cdot SIN(\theta)\cdot Ip\cdot SIN(\theta-\phi) \quad (20)$$
$$= Vp\cdot Ip\cdot COS(\phi)/2 - Vp\cdot Ip\cdot COS(2\theta-\phi)$$

and the first term of the equation (20) is active power P, which is a rate of direct current. The second term thereof is an element vibrating for a frequency twice as high as an applied frequency. As described above, active power P and a frequency element twice as high as an applied frequency are included in the momentarily active power vs is outputted from the multiplier 305.

Also, a voltage vc with a phase delayed by 90 degrees ($\pi/2$) from vs is outputted from the SIN-function generator 304, and the following equation is obtained:

$$vc=Vp\cdot SIN(\theta-\pi/2)=-Vp\cdot COS(\theta)$$

At this time, a momentarily reactive power vc·is outputted from the multiplier 306 is as follows:

$$vc\cdot is = Vp\cdot COS(\theta)\cdot Ip\cdot SIN(\theta-\phi) \quad (21)$$
$$= Vp\cdot Ip\cdot SIN(\phi)/2 - Vp\cdot Ip\cdot SIN(2\theta-\phi)$$

and the first term of the equation (21) is reactive power Q, which is a rate of direct current. The second term thereof is an element vibrating with a frequency twice as high as an applied frequency. As described above, reactive power Q and a frequency element twice as high as an applied frequency are included in the momentarily reactive power vc·is.

Actually, in addition to this twice-frequency element, a higher harmonic element due to distortion of a current caused by application of a single-phase voltage and a ripple due to carrier frequencies are included in the momentarily reactive power. Accordingly, active power P and reactive power Q are obtained by filtering a frequency element twice as high as that of a frequency applied thereto with momentarily active power vs·is as well as with momentarily reactive power vc·is and a frequency element more than twice with the filters 307 and 308.

As those filters 307 and 308, a low-pass filter enabling sufficient attenuation of the frequency element twice as high as the applied frequency may be employed. The low-pass filter should have, however, the capability of sufficiently attenuating the twice-higher frequency element. In that case, it is required to make the number of degrees of a filter larger so that a long time is not required to obtain active power P and reactive power Q from the momentarily active power vs·is and momentarily reactive power vc·is.

There is a filtering method that is more effective in which the filters 307 and 208 are so constructed that the twice-higher frequency element is attenuated with a notch filter and the frequency element higher twice or more is attenuated with a low-degree low-pass filter. With this construction, active power P and reactive power Q can be obtained without wasting time so much.

Figure 12:
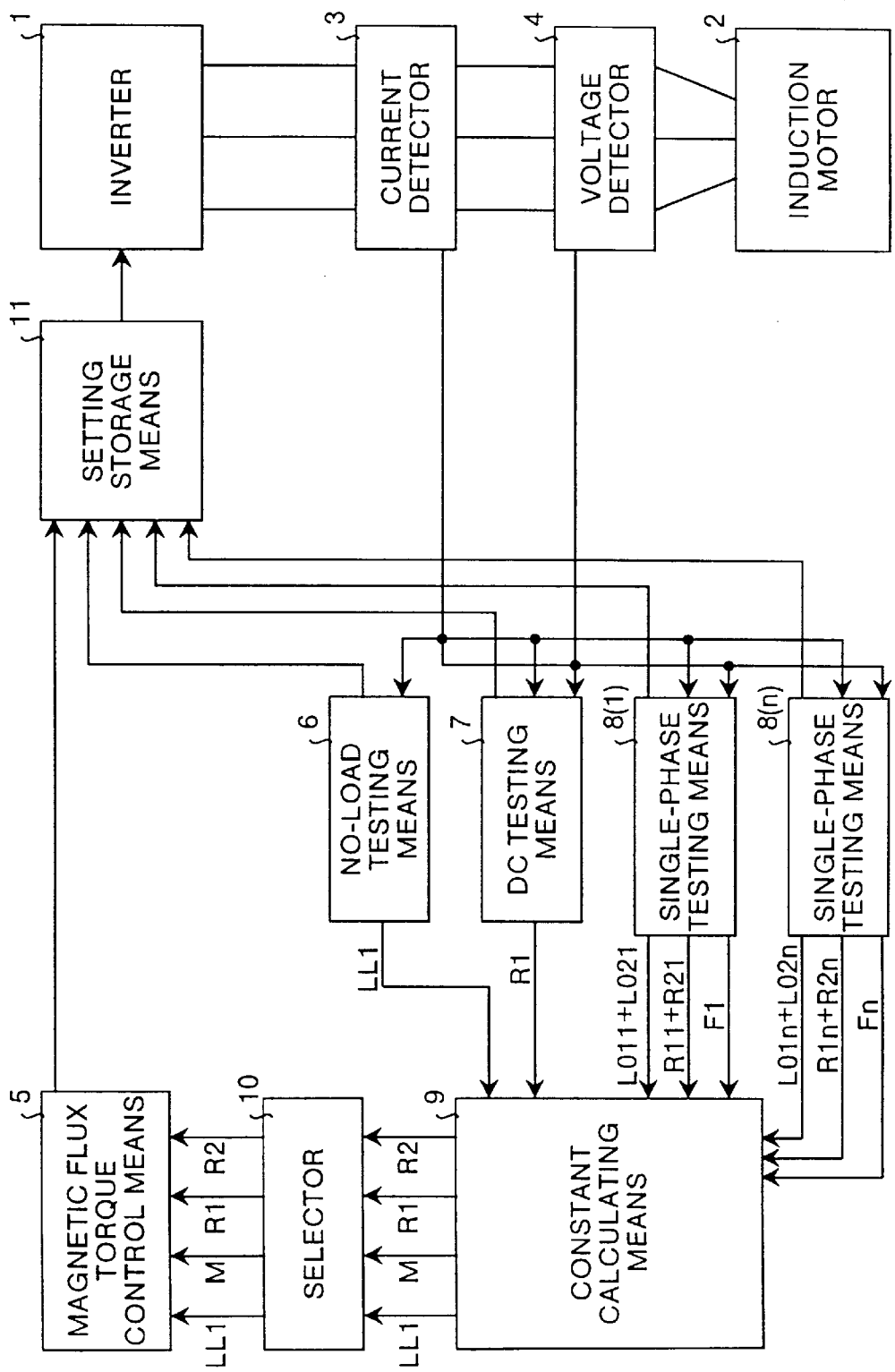
FIG. 12 is a block diagram showing the conventional type of induction motor controller where the skin effect is considered, FIG. 13, including

When each of the secondary resistance and inductance is measured by changing a frequency to 10 Hz, 35 Hz, and 60 Hz as described above, as a gain for anotch filter: a gain to attenuate 20 Hz is used when 10 Hz is applied, a gain to attenuate 70 Hz is used when 35 Hz is applied, and a gain to attenuate 120 Hz is used when 60 Hz is applied, while as a gain for a low-degree low-pass filter: the same gain is used for any frequency. With this construction, it is not required to change each period of time to be averaged depending on a frequency to be applied as is the case where the secondary resistance and inductance are obtained by averaging values as described in the example in FIG. 12. With the construction as described above, active power P and reactive power Q could be obtained in around one second in the experiments.

<Measurement of R2, L with a Specified Current>

Figure 6:
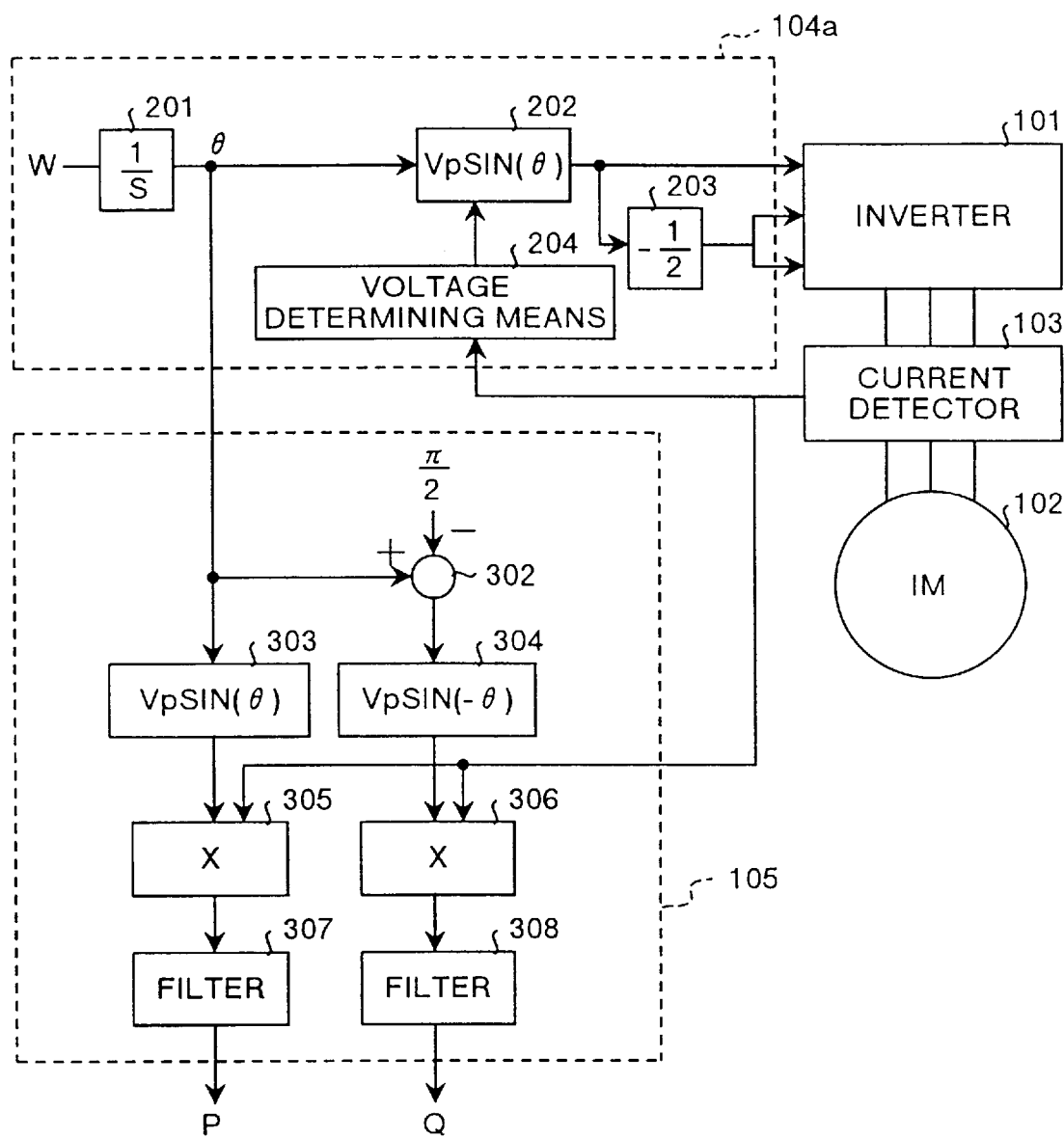

When active power P and reactive power Q are obtained and a secondary resistance as well as a leakage inductance are computed as described above, the secondary resistance and leakage inductance changes depending on the obtained current values. And for this reason, measurement with a specified current is required to obtain values of a secondary resistance and a leakage inductance at the current values when the rated current is applied. FIG. 6 is a block diagram showing the test power commanding means and the power computing means for computing active power P and reactive power Q with a specified current in the induction motor controller according to the present invention, and in the figure, the same reference numerals are assigned to the sections corresponding to those in FIG. 5. In FIG. 6, the reference numeral 204 indicates a voltage determining means for stopping increase of a voltage when the SIN-function generator 202 increases a voltage to be applied by being sloped at a specified angle and a value obtained by squaring a current detected at the time of the increase and averaging the squared current by a time reaches ⅓ of a specified current effective value irms squared, and the voltage determining means is provided in the test power commanding means 104a. When the voltage determining means 204 stops increase of the voltage, the current is a specified current effective value irms.

Next description is made for an operational principle of this induction motor controller. The SIN-function generator 202 increases a voltage with a constant slope kv for a time t so that, assuming the voltage v=Vp·SIN(θ), this Vp is expressed as Vp=kv·t. If the voltage is increased as described above, a current i flowing therein is also obtained as i=ki·t·SIN(θ) and increases with a constant slope ki. It is clear that the voltage determining means 204 may stop increase of the voltage at the point of time t when this "ki t" is equal to "√2·irms". Herein, assuming that a value obtained by squaring the current i and averaging the squared current by a time is X, the following equation is obtained:

$$X = 1/t \cdot \int i^2 dt \qquad (22)$$
$$= 1/t \cdot \int (ki \cdot t \cdot \mathrm{SIN}(\theta))^2 dt$$

This X will be changed to the following equation if a vibration element is ignored:

$$X = (ki \cdot t)^2/6 \qquad (23)$$

As the current i is a specified effective value irms at the instant when ki·t=√2·irms, it is understood that the increase of the voltage may be stopped when X is equal to irms²/3 (X=irms²/3). With those operations, active power P and reactive power Q can be measured with specified current effective values, and dispersion in estimated value for the secondary resistance and the leakage inductance depending on current values to be measured can be eliminated. As described above, in addition to the method of using a value obtained by averaging a detected current squared by a time, the voltage increase may be stopped when a peak value of a detected current reaches a value of the √2 times a specified current effective value irms, but there is the high probability in this method that the slope may be stopped caused by erroneous detection of a current although the current has not reached a preset value, and for this reason careful attention has to be given to noises or the like when the current is detected.

<Correction to Current Sampling Cycle and Delays in Computation>

When active power P and reactive power Q are to be obtained, in the method of obtaining the powers by using a detected current and a command voltage as described in the equation (20) and equation (21), a detected current, a current sampling cycle for a command voltage, and delay in computing largely affects the computed and measured values of active power P and reactive power Q. So next description is made for an inductance motor controller for correcting the current sampling cycle and delay time in computation to clear the influence.

Figure 7:
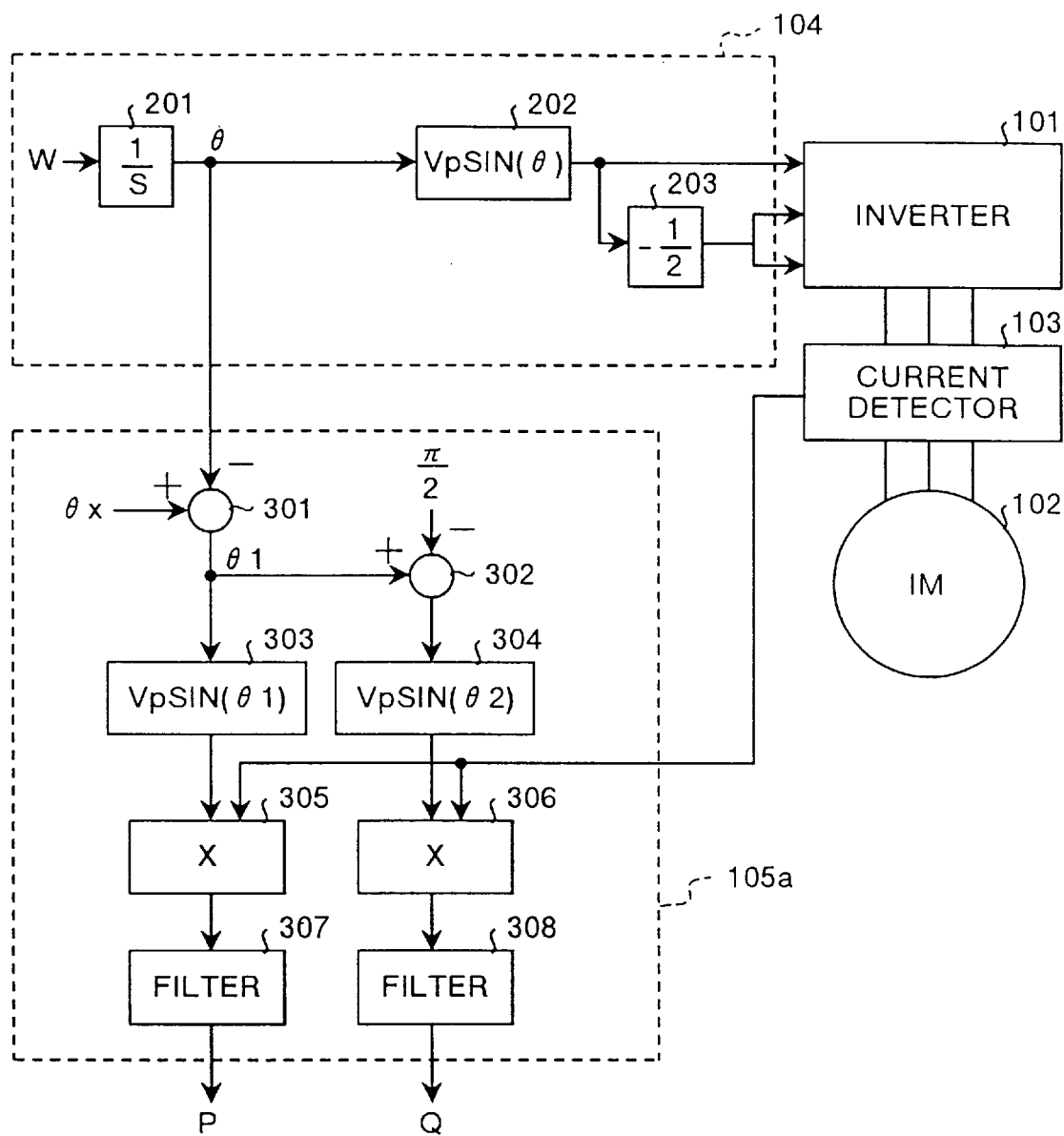

FIG. 7 is a block diagram showing a test power commanding means and a power computing means in the induction motor controller according to the present invention, and in the figure, the same reference numerals are assigned to the sections corresponding to those in FIG. 5. In FIG. 7, the reference numeral 104 indicates a test power commanding means, which obtains a phase θ by integrating angular frequencies ω of a voltage to be applied with the integrator 201 and prepares a command of Vp·SIN(θ) with the SIN-function generator 202. The command is directly applied to the U phase as described in the section <Measurement of R2, L by Applying Single-phase Voltage>, and the voltage is multiplied by −½ times with the gain 203 and applied to the V phase as well as to the W phase. The reference numeral 105a indicates a power computing means, and a phase θ outputted from the integrator 201 is added to a corrected phase θx with the adder 301. This corrected phase θx is calculated with a current sampling cycle Ts and a delay time T cal in computation as follows.

$$\theta x = -\omega(Ts/2 + Tcal) \quad (24)$$

When there is a delay time Tid in the current detector 103, the delay time is also added thereto, so that the following equation is obtained:

$$\theta x = -\omega(Ts/2 + Tcal + Tid) \quad (25)$$

The adder 301 adds the phase θ to the corrected phase Ox and outputs a phase θ1. Then, π/2 is subtracted from the phase θ1 in the adder 302 to obtain a phase θ2. The phase θ1 is inputted in the SIN-function generator 303 to obtain Vp·SIN(θ1). Also the phase θ2 is inputted in the SIN-function generator 304 to obtain Vp·SIN(θ2). Those values are multiplied by a current is with the multipliers 305 and 306 to obtain active power P and reactive power Q through the filters 307 and 308.

By computing and measuring active power P and reactive power Q taking into consideration the corrected phase Ox as described above, the influence of a current sampling cycle and a time delay in computation can be corrected, active power P and reactive power Q can be obtained with high precision without depending on the sampling cycle and delay time in computation, and resultantly the secondary resistance and leakage inductance can be obtained also with high precision.

Embodiment 2

Figure 8:
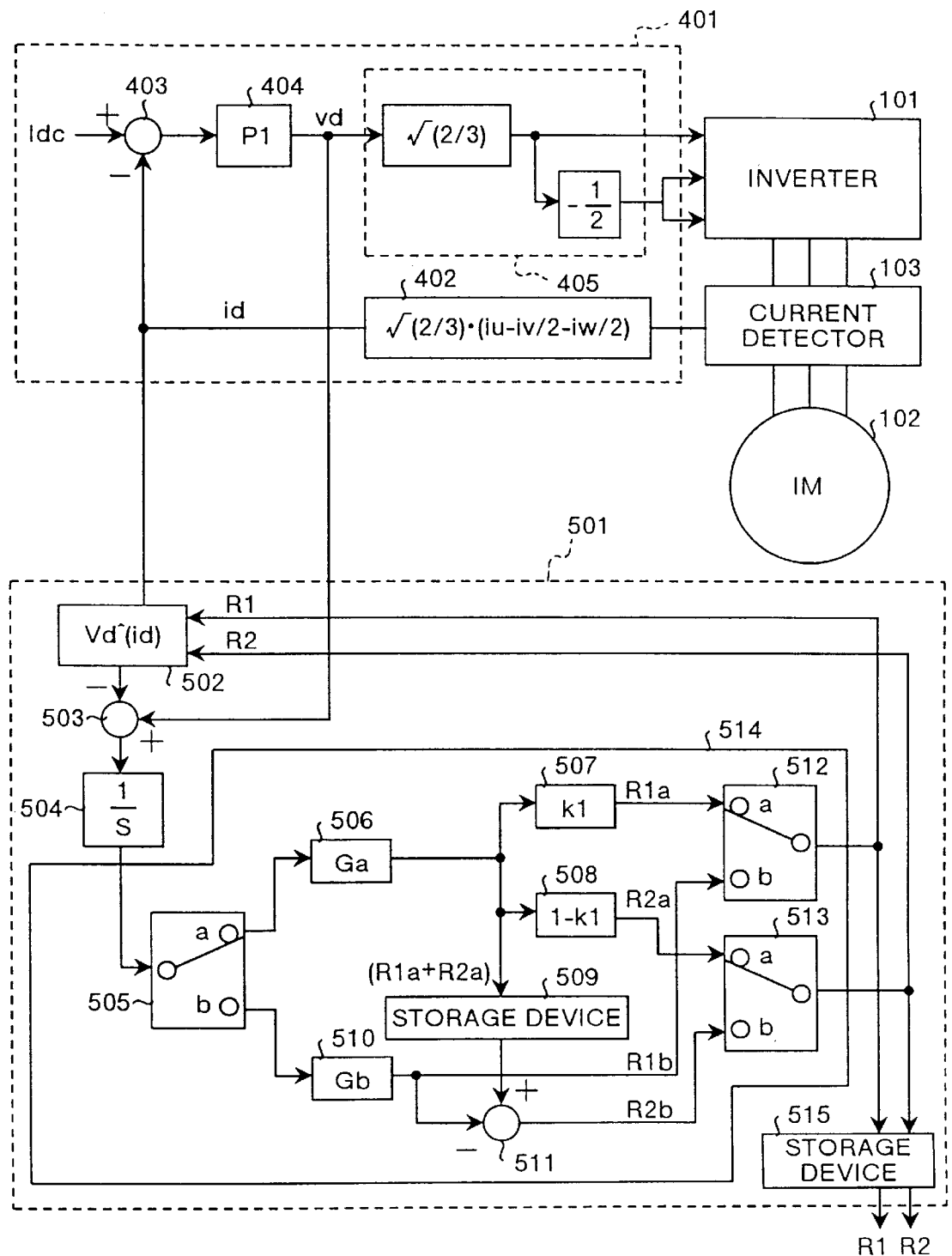

FIG. 8 is a block diagram showing an induction motor controller according to Embodiment 2, and this induction motor controller passes a DC current for a short period of time immediately before activation of the induction motor 102 and obtains a primary resistance and a secondary resistance during the period.

In FIG. 8, a current flowing from the inverter 101 to the induction motor 102 is detected by the current detector 103. The reference numeral 401 indicates a current control means for controlling a current, and controls are provided herein so that a current to the induction motor 102 be a DC current.

This current control means 401 has the configuration as described below. In the figure, designated at the reference numeral 402 is a current coordinates converter for converting a detected three-phase current to an exciting current id, at 403 a subtracter for subtracting a difference between the exciting current id and a command current Idc, and at 404 a PI controller for proportionally integrating and computing the difference, and the PI controller 404 outputs an exciting voltage command vd. The reference numeral 405 indicates a voltage coordinates converter for converting the exciting voltage command Vd to three-phase voltage commands vu, vv, and vw. As described above, the current control means 401 is constructed to control only an exciting current just for a slight period of time immediately after the activation of the motor with a DC current of which phase is fixed.

Next description is made for a resistance estimating device for estimating a primary resistance and a secondary resistance during the period when this DC current is flowing therethrough.

The reference numeral 501 indicates a resistance estimating device which has the configuration as described below. In the figure, designated at the reference numeral 502 is a voltage estimating device for obtaining an exciting-voltage estimated value vd^ from the detected exciting current id by using electrical constants of the induction motor, at 503 a subtracter for subtracting a deviation between an exciting voltage command Vd and an exciting-voltage estimated value vd^ as an output from the voltage estimating device 502, at 504 an integrator for integrating the deviation, and at 505 a selecting switch, which is connected to the side of "a" for a specified period immediately after the motor is activated (described as a period "a" hereinafter), and is connected to the side of "b" for a specified period thereafter (described as a period "b" hereinafter). The reference numeral 506 indicates an estimated gain in the period "a". Output from the estimated gain 506 at this time is a sum (R1a+R2a) of primary resistance and secondary resistance. The reference numeral 507 indicates a gain for separating the sum (R1a+R2a) at an appropriate ratio k1 and obtaining the primary resistance R1a. This gain k1 is not less than 0 and not more than 1. The reference numeral 508 indicates a gain for obtaining secondary resistance R2a from the sum (R1a+R2a), and the gain is set to 1−k1. The reference numeral 509 indicates a storage device for storing therein this (R1a+R2a) at the point of time the period "a" is time-out.

Then, when the selecting switch 505 is switched to the "b" side, a primary resistance R1b is estimated with an estimated gain 510. At this time, a secondary resistance is obtained by subtracting the primary resistance R1b from the sum (R1a+R2a) stored in the storage device 509 with a subtracter 511. The secondary resistance obtained as described above is indicated by R2b. The voltage estimating device 502 computes primary/secondary leakage inductances L1, L2 and a mutual inductance M among the electrical constants of the induction motor 102 assuming that each thereof is constant, feeds back the values R1a and R2a in the period "a" and the values R1b, R2b in the period "b" as resistance values R1, R2 from the selecting switch 512, 513, outputs an exciting-voltage estimated value vd^ from the voltage estimating device 502, and determines that the resistances values R1, R2 approach the true values when a deviation between the exciting-voltage estimated value vd^ and the exciting voltage command Vd is zero or not more than a specified value.

Finally, the primary resistance and secondary resistance R1 and R2 at the points of time when the period "a" and the period "b" are over are stored in a storage device 515, and are used as constants for the actual operation of the motor. In the above example, the deviation between the exciting-voltage estimated value vd^ as output from the voltage estimating device 502 and the exciting voltage command Vd is integrated with the integrator 504, but proportional integration may be used in place of the normal integration as described above.

<Principles of Resistance Estimation>

Figure 9A:
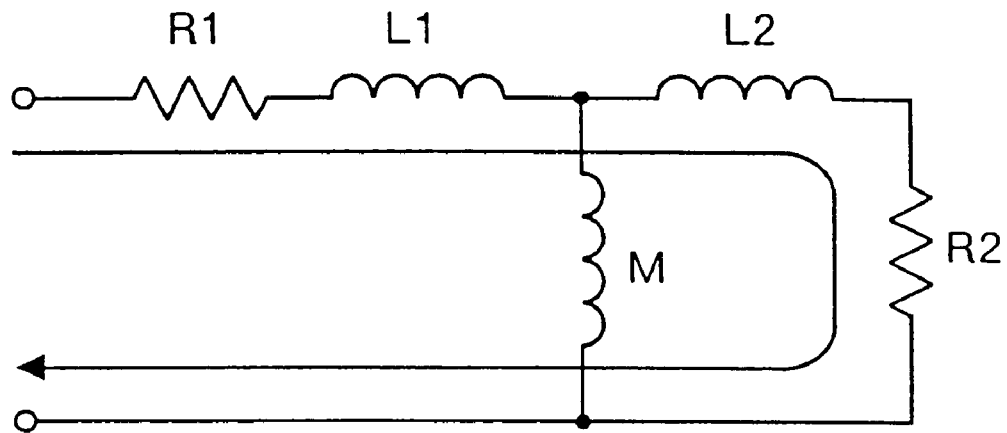
FIG. 9(a) and FIG. 9(b), shows equivalent circuit diagrams of the induction motor for explaining operations of the induction motor controller according to Embodiment 2 of the present invention.
Figure 9B:
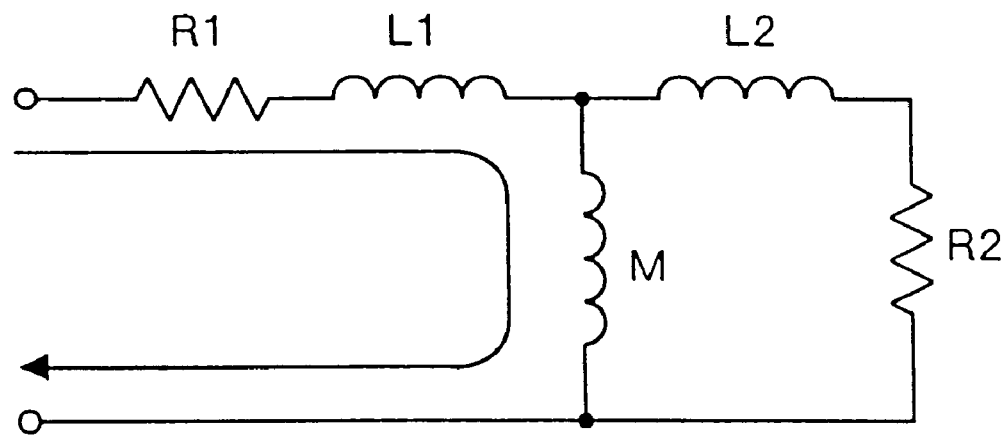

Next description is made for principles of this resistance estimation. As the current control system is constructed as described above, a step-formed current flows at the time of activation of the motor. The system in the period "a" is a transient high-frequency area with the step-formed current added thereto, so that the current hardly flows to the mutual inductance M, but flows to the secondary side as shown in FIG. 9(a). Therefore, the sum of the primary resistance and secondary resistance as an amount of resistance on a route along which the current flows can be obtained. The system in the period "b" is an DC area in which a current is substantially a stationary current, so that the mutual inductance M is equivalent to a short circuit, and the current flows only to the primary side as shown in FIG. 9(b). Therefore, only the primary resistance as an amount of resistance on a route along which the current flows can be obtained. The current also flows to the secondary side in the period "b", but estimation of the secondary resistance can be completed within a short period of time because the current value therein is only a small amount, and in addition, the resistance value at a certain degree of precision is obtained in the period "a", so that if correction to the value can successfully be made, there is no need of continuing estimation of the secondary resistance in the period "b" until flow of the current into the secondary side is completely stopped.

As described above, the sum of the primary resistance and secondary resistance is obtained and further the primary resistance is obtained, so that both of the primary resistance and secondary resistance are obtained as a result.

Then, the resistance estimating device 501 computes a voltage by using electrical constants of the induction motor from the detected current, obtains an exciting-voltage estimated value vd^, integrates a deviation between the exciting-voltage estimated value vd^ and an exciting voltage command vd, and estimates the resistance, and the principle of estimation is briefly described below.

An actual current and a voltage of the induction motor 102 are determined as an exciting current id and an exciting voltage command vd, and a relation therebetween is expressed with electrical constants of the induction motor 102.

Herein, when an exciting-voltage estimated value vd^ is estimated and computed by using electrical constants of the induction motor 102 which are known from the exciting current id at that point of time, the exciting-voltage estimated value vd^ has a difference from an exciting voltage command vd by the difference that the determined electrical constants have. And for this reason, as it is assumed that primary/secondary leakage inductance L1, L2 and mutual inductance M among the electrical constants are preset constants in spite of increase in temperature, and by operating resistance values R1, R2 used in the voltage estimating device 502 with a value obtained by integrating deviations between the exciting-voltage estimated value vd^ and the exciting voltage command vd, the exciting-voltage estimated value vd^ and the exciting voltage command vd become gradually coincident with each other.

It can be determined that feedback resistance values R1, R2 used in the voltage estimating device 502 are coincident to the true values at the point of time when the exciting-voltage estimated value vd^ and the exciting voltage command vd have coincided with each other as described above.

Although the voltage estimating device 502 is used in FIG. 8, the same effect can also be obtained by using a current estimating device.

Figure 10:
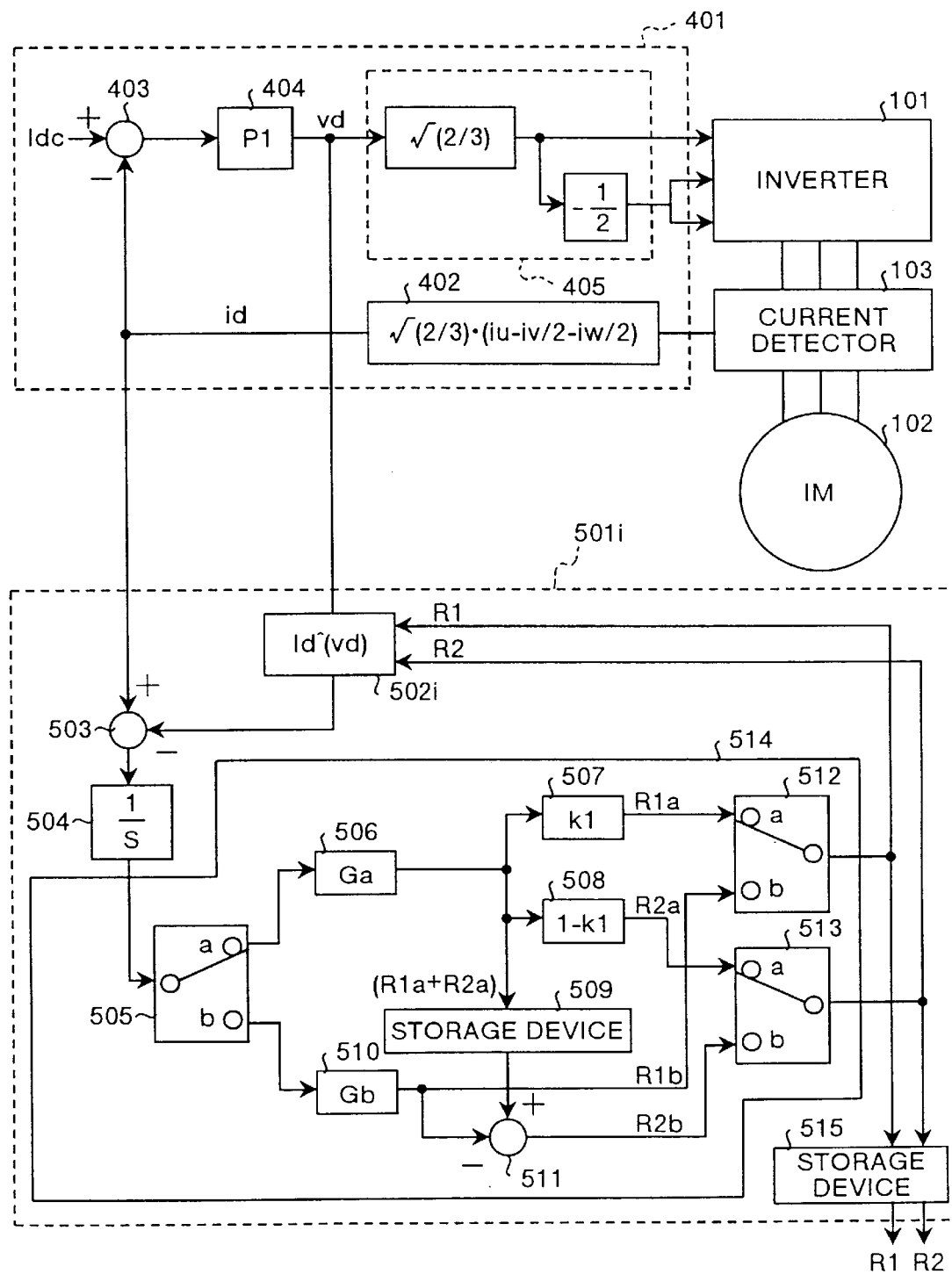

FIG. 10 is a block diagram showing the induction motor controller comprising the current estimating device, and in the figure, the same reference numerals are assigned to the sections corresponding to those in FIG. 8. In FIG. 10, designated at the reference numeral 501i is a resistance estimating device, and at 502i a current estimating device. An exciting voltage command vd is inputted into the current estimating device 502i, which estimates and computes a current estimated value Id^ by using electrical constants of the induction motor 102 from the voltage value. A method of integrating deviations between the current estimated value Id^ and an exciting current id as an actual current to obtain a resistance estimated value is the same as the case where the voltage estimating device 502 is used.

Figure 11:
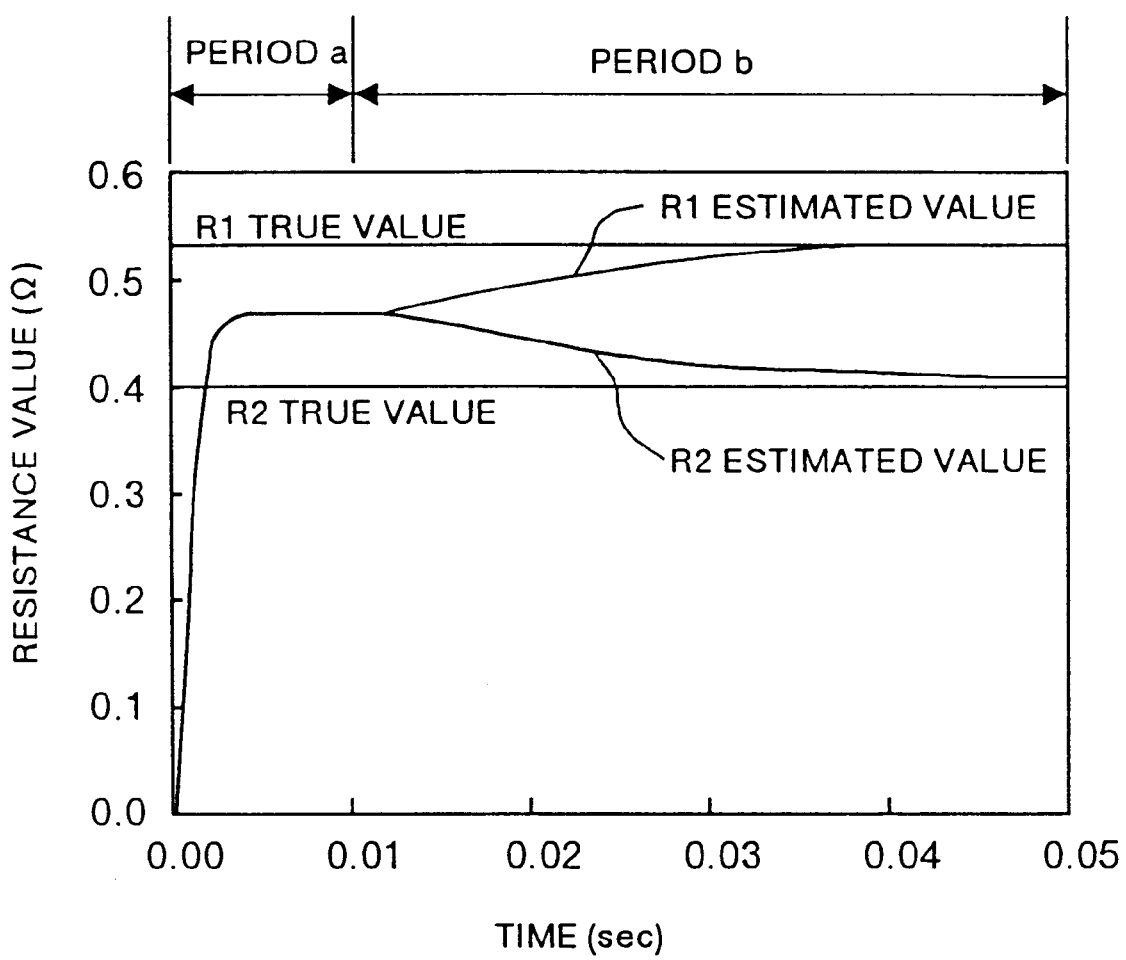

A result of actually estimating resistances in the configuration described above is shown in FIG. 11. FIG. 11 shows estimated values in a case where a 3.7 kw motor is used as an induction motor and a time is 0.05 sec in total assuming that a time of the period "a" is 0.01 sec and a time of the period "b" is 0.04 sec, and an appropriate ratio k1 for obtaining primary resistance from the sum of primary resistance and secondary resistance used in the period "a" is 0.5. Accordingly, a ratio 1−k1 for obtaining a secondary resistance from the sum of the primary resistance and secondary resistance is also 0.5, and for this reason, the primary resistance is equal to the secondary resistance in the period "a". A true value of an actual primary resistance is 0.532Ω, while a true value of an actual secondary resistance is 0.400Ω, but an appropriate ratio may be put in the period "a". The secondary resistance is obtained in the period "b" by estimating the primary resistance and subtracting the estimated primary resistance from the sum obtained in the period "a". The estimation is substantially converged within such a short time as 0.05 sec obtained by summing the period "a" to the period "b". Although the secondary-resistance estimated value is estimated slightly larger in FIG. 11, the value is small enough to resolve shortage of torque at the time of activation of the motor.

<Reduction of Measuring Time and Correction to Error>

The estimation of resistance in the activation of the motor can be completed within a short time, but some problems as described below have been found during the experiments actually carried out under various conditions.

(1) A time required for estimation is longer if the appropriate ratio k1 used in the estimation period "a" is largely different from a due value.

(2) Although there is no problem on shortage of a starting torque, a slight error is included in the estimated value as described above, and for this reason, a slight error may be included in computation on a speed and a torque during actual operations after the activation of the motor.

The problems are to be explained more detailedly, and a way of correcting the problems is described below.

At first, description is made for a case where the appropriate ration k1 is substantially incorrect in the period "a".

A ratio between primary resistance and secondary resistance is substantially 1:1 in, for example, a 3.7 kw-induction motor although there is some difference in each maker, and the ratio k1 used in the period "a" is as follows: k1=1/(1+1)=0.5. Even if this ratio is slightly incorrect as described above, the primary resistance and secondary resistance can correctly be estimated when the period "b" is over. However, if an around 50 m-connecting cable is attached to the induction motor, a total resistance between resistance in the connecting cable and primary resistance in the induction motor 102 is around twice as large as the primary resistance in the induction motor 102. In this case, when the estimation is carried out with k1=0.5 as it is, a long time is required for converging on an estimated value for resistance in the period "b".

For the purpose of clearing the problem, a ratio between a primary resistance and a secondary resistance including cable resistance obtained by applying a test power such as a single-phase voltage to the motor only once before the activation thereof as described in Embodiment 1 is obtained and stored, and the ratio is used as a ratio k1 in the activation period "a", so that a time required for converging on an estimated value for resistance in the period "b" can be prevented from its being long, and estimation can always be made within a short time.

Next description is made for measures directed to the problem that a slight error may be included in computation on a speed and a torque during actual operations after the activation of the motor because a slight error has been included in an estimated resistance value as described above.

A result of estimating secondary resistance includes an error if the estimation is carried out based on the resistance in the activation of the induction motor controller shown in FIG. 8 and FIG. 10. It is supposed that the cause thereof may be due to skin effect, while it has been found from the experiments that this error between an estimated value and a true value always keeps a constant ratio even if a temperature in the induction motor 102 is changed and a resistance value is changed.

For this reason, the primary resistance R10 and secondary resistance R20 are obtained by applying a test power such as a single-phase voltage to the induction motor 102 as described in Embodiment 1 only once before the activation thereof, a resistance in the activation thereof is estimated according to Embodiment 2 within a time to some degree that a temperature in winding is not changed, namely substantially the same time, and the primary resistance R11 and secondary resistance R21 are obtained. A ratio C1 between the primary resistance R10 and primary resistance R11 and a ratio C2 between the secondary resistance R20 and secondary resistance R21 are stored, and correction is made by multiplying the estimated primary resistance R12 by the ratio C1 as well as the estimated secondary resistance R22 by the ratio C2 at the point of time when the estimation is time-out in the actual activation of the motor as shown in Embodiment 2. If the resistance value corrected as described above is obtained and this corrected resistance value is used for the actual operations thereof, an error in computation on a speed and torque can be made extremely smaller.

<Measurement of Resistance during Stopping Period of Repeat Operations>

Although the induction motor controller as described in Embodiment 2 estimates resistance values in the activation thereof, a stopping period during repeat operations is, in many cases, around two seconds or more just like an operation pattern of an elevator. In that case, there is no need to estimate resistance when the motor is activated, and the estimation of the resistance is carried out during the stopping period by applying a DC voltage or a single-phase voltage thereto. The method of estimation has been described in Embodiment 1. In the induction motor controller described in Embodiment 1, it takes three seconds or so to estimate the resistance because command voltages for three frequencies are applied, but it is found from the experiments that the dispersion in values is 1% or less, which is a very small amount, so that a sufficient result of the estimation can be obtained. In the induction motor controller described in Embodiment 2, the estimation can be finished within a short time such as 0.05 sec or so, but there is the dispersion in values by several %. In this case, there may be used a method of repeatedly estimating values several times during the stopping period of the repeat operations and averaging the values to reduce an error. With those operations, an error in estimation of resistance can further be reduced as compared to the case where the estimation is made only when the motor is activated.

Also, it takes three seconds or so to estimate the resistance in the induction motor controller described in Embodiment 1. To clear the problem, when not so much time can be afforded for the stopping period, during the stopping period, the secondary resistance/leakage inductance computing/measuring means 106 measures secondary resistance R23 for a certain frequency f1 obtains a value of secondary resistance R21 for the frequency f1 from the rational function obtained by the skin-effect considered computing means 107 by previously applying three different frequencies as described in Embodiment 1, stores a ratio C3 between this secondary resistance R21 and the secondary resistance R23, obtains secondary resistance R24 for a slip frequency $f_2$ when the motor is actually operated, and obtains the secondary resistance when the motor is actually operated by multiplying this secondary resistance R24 by the ratio C3. With those operations, the secondary resistance for a desired slip frequency can be estimated with much less dispersion in values, namely with high precision within only one second or so.

Industrial Applicability

As described above, the induction motor controller according to the present invention is applicable to, for instance, an induction motor controller in which test power is supplied to a polyphase induction motor by a polyphase inverter to measure electrical constants such as a primary/secondary resistance as well as a leakage inductance thereof and vector controls are provided over the polyphase induction motor without a speed sensor by using parameters for controlling driving of a result of this measurement.

What is claimed is:

1. An induction motor controller for measuring electrical constants of a polyphase induction motor by supplying test power thereto with a polyphase inverter and driving/controlling said polyphase induction motor with said polyphase inverter using a result of this measurement for parameters of driving control; said controller comprising:

a first computing means for computing a secondary winding resistance R2 as well as a leakage inductance L corresponding to each of test conditions with said test power for at least three different frequencies f; and a second computing means having a rational function including, but not limited to, a quadratic equation of a frequency f with the secondary winding resistance R2 as a denominator and the leakage inductance L as a numerator, for obtaining this rational function by substituting the secondary winding resistance R2 as well as the leakage inductance L corresponding to each of the test conditions in said rational function, and computing the secondary winding resistance R2 as well as the leakage inductance L by substituting a desired secondary slip frequency in this obtained rational function.

2. The induction motor controller according to claim 1; wherein the second computing means has rational functions as follows:

$$R2(f) = (a1 + a2 \cdot f^2)/(1 + a3 \cdot f^2)$$

$$L(f) = (b1 + b2 \cdot f^2)/(1 + b3 \cdot f^2)$$

wherein a1, a2 and a3 are real numbers defining the rational function R2(f), and b1, b2 and b3 are real numbers defining the rational function L(f).

3. The induction motor controller according to claim 2; wherein the second computing means obtains only factors a1 and b1, and computes a secondary winding resistance R2 as well as a leakage inductance L corresponding to low secondary slip frequency.

4. The induction motor controller according to claim 1; wherein the first computing means computes a first secondary winding resistance R2 for a prespecified frequency f; and the second computing means obtains a second secondary winding resistance R2 by substituting said prespecified frequency f in a rational function having previously been obtained by this second computing means, obtaining a third secondary winding resistance R2 by substituting a desired secondary slip frequency f in the rational function, and by multiplying this third secondary winding resistance R2 by a ratio between the second secondary winding resistance R2 and the first secondary winding resistance R2.

5. An induction motor controller for measuring electrical constants of a polyphase induction motor by supplying test power thereto with a polyphase inverter and driving/controlling said polyphase induction motor with said polyphase inverter using a result of this measurement for parameters of driving control; said controller comprising:

a power computing means for computing active power P and reactive power Q corresponding to said test power of a frequency f; a first computing means for obtaining secondary resistance R2d and secondary leakage inductance L2d from a computing equation obtained with an L-type equivalent circuit from a phase voltage peak value Vp as well as a primary angular frequency ω corresponding to said frequency f, said active power P as well as said reactive power Q, and primary resistance R1 having previously been measured;

and a second computing means for obtaining the secondary resistance R2 and secondary leakage inductance L by substituting said secondary resistance R2d as well as said secondary leakage inductance L2d having been obtained by the first computing means and secondary self inductance LL2 having previously been measured in each of computing equations of the secondary resistance R2 and the secondary leakage inductance L having been obtained by a T-type equivalent circuit respectively.

6. The induction motor controller according to claim 5; wherein the computing equations obtained by the L-type equivalent circuit are as follows:

$$L2d = Q \cdot Vp^2/(4 \cdot \omega \cdot (P^2+Q^2))$$

$$R2d = P \cdot Vp^2/(2 \cdot (P^2+Q^2)) - R1$$

the computing equations obtained by the T-type equivalent circuit are as follows:

$$L = L2d + (2 \cdot L2d - LL2) \cdot R2d^2/(2 \cdot \omega^2 \cdot LL2^2)$$

$$R2 = R2d \cdot LL2^2/(LL2 - L2d)^2.$$

7. The induction motor controller according to claim 5; wherein the power computing means computes momentarily active power as well as momentarily reactive power from an applied voltage of a single-phase current supplied to the polyphase induction motor by the polyphase inverter, and filters a high-frequency element from said momentarily active power as well as said momentarily reactive power.

8. The induction motor controller according to claim 7; wherein the power computing means filters a frequency element twice as high as that of the applied voltage with a notch filter from said momentarily active power as well as said momentarily reactive power, and also filters a high-frequency element exceeding said twice-high frequency element with a low-pass filter.

9. The induction motor controller according to claim 5 further comprising a test power commanding means for outputting a command voltage to a polyphase inverter so that the polyphase inventor supplies a specified effective value current to the polyphase induction motor.

10. The induction motor controller according to claim 9; wherein the test power commanding means increases a command voltage to the polyphase inverter at a specified rise rate, and stops increasing said command voltage when an average value of a time obtained by squaring an effective value current supplied to the polyphase induction motor by the polyphase inverter in accordance with the rise of this command voltage is equal to ⅓ of the specified effective value current or larger.

11. The induction motor controller according to claim 5 further comprising a test power commanding means for outputting a command voltage to a polyphase inverter; wherein the power computing means computes active power P as well as reactive power Q by correcting a phase of said command voltage based on a corrected phase corresponding to a delay time due to measurement and computation.

12. An induction motor controller for measuring electrical constants of a polyphase induction motor by supplying test power thereto with a polyphase inverter and driving/controlling said polyphase induction motor with said polyphase inverter using a result of this measurement for parameters of driving control; said controller comprising: a current control means for controlling said polyphase inverter, and applying a specified DC command voltage to said polyphase induction motor being at rest to supply a DC current thereto; and a resistance estimating means for inputting thereto said DC voltage and said DC current, computing total resistance of primary resistance and secondary resistance in a first period immediately after the supply of a current by said current control means, computing the primary resistance in a second period following said first period, subtracting said primary resistance computed in said second period from said total resistance having been computed in said first period and estimating said secondary resistance.

13. The induction motor controller according to claim 12; wherein the resistance estimating means comprises a voltage estimating device for estimating a DC voltage value applied to the polyphase induction motor from the DC current supplied to said polyphase induction motor, a known circuit constant of said polyphase induction motor, and from the fed-back primary winding resistance as well as secondary winding resistance; an integrator for integrating deviations between said DC voltage value and DC voltage command value; and a resistance computing means for computing total resistance of the primary winding and the secondary winding in the first period based on output from this integrator, separating this total resistance to the primary winding resistance and the secondary winding resistance, which are to be fed back to said voltage estimating device, computing the primary winding resistance in the second period based on output from the integrator, subtracting said primary winding resistance measured in said second period from said total resistance having been computed in said first period and estimating the secondary winding resistance, and feeding back said computed primary winding resistance as well as said estimated secondary winding resistance to said voltage estimating device; and said resistance estimating means controls said polyphase induction motor by using said primary winding resistance as well as secondary winding resistance measured and estimated in said second period when said deviation reaches the specified value or less.

14. The induction motor controller according to claim 13; wherein the resistance computing means separates the total resistance computed in the first period to the primary winding resistance and the secondary winding resistance at a prespecified ratio.

15. The induction motor controller according to claim 12; wherein the resistance estimating means comprises:

a current estimating device for estimating a DC current value supplied to the polyphase induction motor from the DC command voltage commanded to said polyphase induction motor, a known circuit constant of said polyphase induction motor, and the fed-back primary winding resistance as well as secondary winding resistance;

a computing device for integrating deviations between the DC current value and a detected value of a DC current supplied to said polyphase induction motor; and a resistance computing means for computing total resistance of the primary winding and the secondary winding in the first period based on output from the computing device, separating this total resistance to the primary winding resistance and the secondary winding resistance, which are to be fed back to said current estimating device, computing the primary winding resistance in the second period based on output from the computing device, subtracting said primary winding resistance measured in said second period from said total resistance having been computed in said first period, estimating the secondary winding resistance and feeding back said computed primary winding resistance as well as said estimated secondary winding resistance to said current estimating device;

and wherein said resistance estimating means controls said polyphase induction motor by using said primary winding resistance as well as secondary winding resistance measured and estimated in said second period when said deviation becomes the specified value or less.

16. The induction motor controller according to claim 12 further comprising a storage means for storing therein a ratio between the primary resistance R1 as well as the secondary resistance R2 due to AC current application obtained by previously applying an AC voltage to the polyphase inductance motor and the primary resistance R1 as well as the secondary resistance R2 due to application of a DC voltage estimated at substantially the same time by the resistance estimating means; and said controller for correcting the primary resistance R1 as well as the secondary resistance R2 having been estimated by the resistance estimating means at the ratio stored in said storage means.

17. The induction motor controller according to claim 12 for controlling a polyphase induction motor by estimating primary resistance and secondary resistance in a stopping period of said polyphase induction motor which repeats an operating period and a stopping period.

18. An induction motor controller for measuring electrical constants of a polyphase induction motor by supplying test power thereto with a polyphase inverter and driving/controlling said polyphase induction motor with said polyphase inverter using a result of this measurement for parameters of driving control; said controller comprising:

a first computing means for computing a secondary winding resistance R2 corresponding to each of test conditions with said test power for at least three different frequencies f; and a second computing means having a rational function including, but not limited to, a quadratic equation of a frequency f, for obtaining this rational function by substituting the secondary winding resistance R2 corresponding to each of the test conditions in said rational function, and computing the secondary winding resistance R2 by substituting a desired secondary slip frequency in this obtained rational function.

19. The induction motor controller according to claim 18; wherein the second computing means has a rational function as follows:

$$R2(f)=(a1+a2 \cdot f^2)/(1+a3 \cdot f^2)$$

wherein a1, a2 and a3 are real numbers defining the rational function R2(f).

20. An induction motor controller for measuring electrical constants of a polyphase induction motor by supplying test power thereto with a polyphase inverter and driving/controlling said polyphase induction motor with said polyphase inverter using a result of this measurement for parameters of driving control; said controller comprising:

a first computing means for computing a leakage inductance L corresponding to each of test conditions with said test power for at least three different frequencies f; and a second computing means having a rational function including, but not limited to, a quadratic equation of a frequency f, for obtaining this rational function by substituting the leakage inductance L corresponding to each of the test conditions in said rational function, and computing the leakage inductance L by substituting a desired secondary slip frequency in this obtained rational function.

21. The induction motor controller according to claim 20; wherein the second computing means has a rational functions as follows:

$$L(f)=(b1+b2 \cdot f^2)/(1+b3 \cdot f^2)$$

wherein b1, b2 and b3 are real numbers defining the rational function L(f).

22. An induction motor apparatus comprising a polyphase induction motor, a polyphase inverter supplying power to said polyphase induction motor, and a controller causing said polyphase inverter to supply test power to said polyphase induction motor for measuring at least one electrical constant of said polyphase induction motor and to drive/control said polyphase induction motor using a result of this measurement for parameter of driving control, said controller comprising:

a first computing means for computing a secondary winding resistance R2 corresponding to each of test conditions with said test power for at least three different frequencies f; and a second computing means having a rational function including, but not limited to, a quadratic equation of a frequency f, for obtaining this rational function by substituting the secondary winding resistance R2 corresponding to each of the test conditions in said rational function, and computing the secondary winding resistance R2 by substituting a desired secondary slip frequency in this obtained rational function.

23. The induction motor apparatus according to claim 22, wherein the second computing means has said rational function as follows:

$$R2(f)=(a1+a2 \cdot f^2)/(1+a3 \cdot f^2)$$

wherein a1, a2 and a3 are real numbers defining the rational function R2(f).

24. An induction motor apparatus comprising a polyphase induction motor, a polyphase inverter supplying power to said polyphase induction motor, and a controller causing said polyphase inverter to supply test power to said polyphase induction motor for measuring at least one electrical constant of said polyphase induction motor and to drive/control said polyphase induction motor using a result of this measurement for parameter of driving control, said controller comprising:

a first computing means for computing a leakage inductance L corresponding to each of test conditions with said test power for at least three different frequencies f; and a second computing means having a rational function including, but not limited to, a quadratic equation of a frequency of f, for obtaining this rational function by substituting the leakage inductance L corresponding to each of the test conditions in said rational function, and computing the leakage inductance L by substituting a desired secondary slip frequency in this obtained rational functional.

25. The induction motor apparatus according to claim 24, wherein the second computing means has said rational function as follows:

$$L(f)=(b1+b2 \cdot f^2)/(1+b3 \cdot f^2)$$

wherein b1, b2 and b3 are real numbers defining the rational function L(f).

26. An induction motor apparatus comprising a polyphase induction motor, a polyphase inverter supplying power to said polyphase induction motor, and a controller causing said polyphase inverter to supply test power to said polyphase induction motor for measuring electrical constants of said polyphase induction motor and to drive/control said polyphase induction motor using a result of this measurement for parameters of driving control; said controller comprising:

a power computing means for computing active power P and reactive power Q corresponding to said test power of a frequency f; a first computing means for obtaining secondary resistance R2d and secondary leakage inductance L2d from a computing equation obtained with an L-type equivalent circuit from a phase voltage peak value Vp as well as a primary angular frequency ω corresponding to said frequency f, said active power P as well as said reactive power Q, and primary resistance R1 having previously been measured; and a second computing means for obtaining the secondary resistance R2 and secondary leakage inductance L by substituting said secondary resistance R2d as well as said secondary leakage inductance L2d having been obtained by the first computing means and secondary self-inductance LL2 having previously been measured in each of computing equations of the secondary resistance R2 and the secondary leakage inductance L having been obtained by a T-type equivalent circuit respectively.

27. An induction motor apparatus comprising a polyphase induction motor, a polyphase inverter supplying power to said polyphase induction motor, and a controller causing said polyphase inverter to supply test power to said polyphase induction motor for measuring electrical constants of said polyphase induction motor and to drive/control said polyphase induction motor using a result of this measurement for parameters of driving control, said controller comprising:

a current control means for controlling said polyphase inverter, and applying a specified DC command voltage to said polyphase induction motor being at rest to supply a DC current thereto; and a resistance estimating means for inputting thereto said DC voltage and said DC current, computing total resistance of primary resistance and secondary resistance in first period immediately after the supply of a current by said current control means, computing the primary resistance in a second period following said first period, subtracting said primary resistance computed in said second period from said total resistance having been computed in said first period and estimating said secondary resistance.

* * * * *